United States Patent [19]
Arakawa et al.

[11] Patent Number: 6,160,463
[45] Date of Patent: Dec. 12, 2000

[54] DIELECTRIC WAVEGUIDE RESONATOR, DIELECTRIC WAVEGUIDE FILTER, AND METHOD OF ADJUSTING THE CHARACTERISTICS THEREOF

[75] Inventors: Shigeji Arakawa, Kanazawa; Kikuo Tsunoda, Ishikawa-ken, both of Japan

[73] Assignee: Murata Manufacturing Co., Ltd., Japan

[21] Appl. No.: 09/465,154

[22] Filed: Dec. 16, 1999

Related U.S. Application Data

[62] Division of application No. 08/871,333, Jun. 9, 1997, Pat. No. 6,020,800.

[30] Foreign Application Priority Data

| Jun. 10, 1996 | [JP] | Japan | 8-147112 |
| Jul. 23, 1996 | [JP] | Japan | 8-193178 |
| May 29, 1997 | [JP] | Japan | 9-140116 |

[51] Int. Cl.⁷ .............. H01P 1/20; H01P 5/00; H01P 7/10
[52] U.S. Cl. ............ 333/202; 333/208; 333/219.1; 333/222
[58] Field of Search .................. 333/202, 206, 333/208, 209, 239, 248, 210, 219, 219.1, 222

[56] References Cited

U.S. PATENT DOCUMENTS

| 5,327,108 | 7/1994 | Hoang et al. | 333/206 X |
| 5,410,285 | 4/1995 | Konishi | 333/206 |
| 5,629,656 | 5/1997 | Tada et al. | 333/206 X |
| 5,731,751 | 3/1998 | Vangala | 333/209 X |
| 5,926,079 | 7/1999 | Heine et al. | 333/208 |

FOREIGN PATENT DOCUMENTS

| 63-220603 | 9/1988 | Japan | 333/208 |
| 3-270501 | 12/1991 | Japan . |  |
| 5-129814 | 5/1993 | Japan . |  |

Primary Examiner—Robert Pascal
Assistant Examiner—Barbara Summons
Attorney, Agent, or Firm—Ostrolenk, Faber, Gerb & Soffen, LLP

[57] ABSTRACT

A conducting film is formed on a dielectric block in a dielectric waveguide resonator, and through-holes are formed in the dielectric block. The unloaded Q is set by selecting the outside dimensions of the dielectric block. The resonance frequency is set by selecting the size and location of the through-holes as well as the outside dimensions of the dielectric block. Terminal electrodes are formed on the outer surface of the dielectric block. Coupling electrodes are formed on the inner surfaces of the through-holes. One end of each coupling electrode is connected to the corresponding terminal electrode and the other end of the coupling electrode may be connected to the conducting film formed on the outer surface of the dielectric block. Alternatively, the other end of the coupling electrode may be partially removed to adjust the amount of coupling; or may be completely removed so as to isolate the coupling electrode from the conducting film on the outer surface. The above-described structures increase the degree of freedom in the design of the characteristics, including the resonance frequency and unloaded Q, of the dielectric waveguide resonator. The invention also provides a dielectric waveguide filter with a simple coupling mechanism whereby it is possible to couple to an external circuit without having to use an additional member and without electromagnetic leakage.

7 Claims, 21 Drawing Sheets

FIG. 16
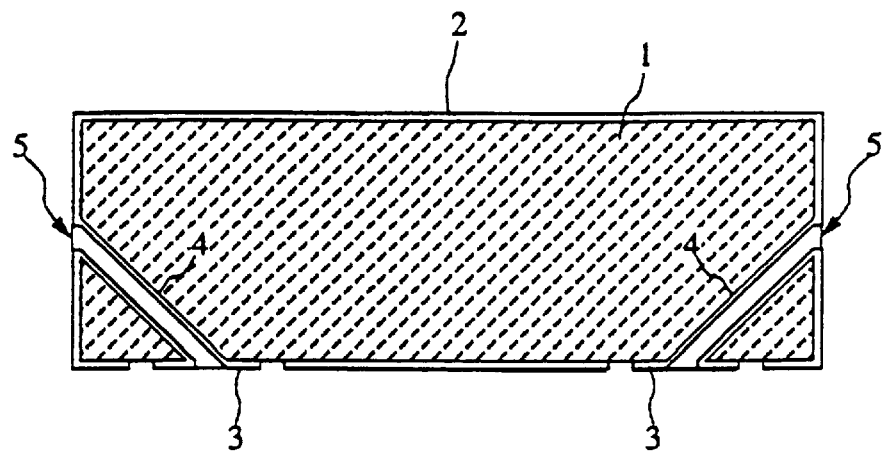
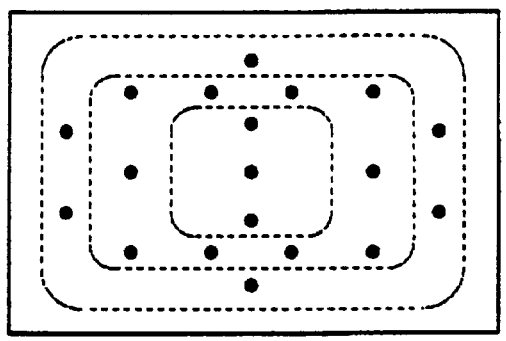
FIG. 17A
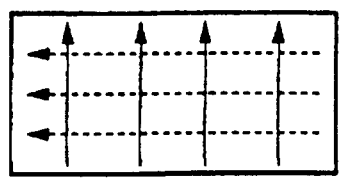
FIG. 17C
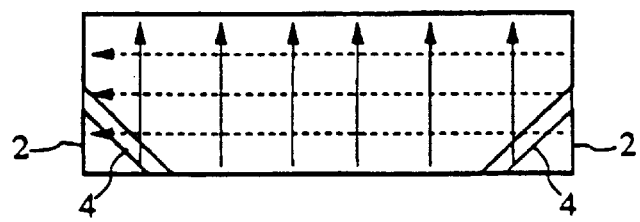
FIG. 17B

DIELECTRIC WAVEGUIDE RESONATOR, DIELECTRIC WAVEGUIDE FILTER, AND METHOD OF ADJUSTING THE CHARACTERISTICS THEREOF

This is a division of application Ser. No. 08/871,333, filed Jun. 9, 1997, now U.S. Pat. No. 6,020,800.

BACKGROUND OF THE INVENTION

1. Field of the Invention

The present invention relates to a dielectric waveguide resonator and a dielectric waveguide filter for use particularly in a microwave or millimeter wave range, and to a method of adjusting the characteristics thereof.

2. Description of the Related Art

There are various types of dielectric resonators known for use in the microwave range. They include: a TE01δ-mode dielectric resonator consisting of a dielectric in the form of a solid circular cylinder or a hollow circular cylinder placed in a shield case; a TM110-mode dielectric resonator consisting of a prism-shaped dielectric which is placed in a metallic case or a case covered with a conducting film in such a manner that the dielectric extends from the upper to the lower faces of the case; and a TEM-mode dielectric resonator consisting of a dielectric wherein an inner conductor is disposed in the dielectric and the outer surface of the dielectric is covered with an outer conductor. These dielectric resonators have their own features and advantages and are used as microwave devices in various applications depending on particular purposes.

The size of these dielectric resonators can be reduced by confining the majority of resonating energy into a dielectric member and furthermore by forming a magnetic wall at a location close to a boundary plane between the dielectric member and air in such a manner that the magnetic wall is coincident with the even-mode symmetric plane. In these dielectric resonators, the resonance frequency and unloaded Q are determined by the size, shape, and dielectric constant of the dielectric resonator and the metallic case, and also by the location of the dielectric member in the metallic case.

In the case of a dielectric waveguide resonator consisting of a dielectric material such as a ceramic dielectric whose outer surface is covered with a conducting film, its size can be reduced by a factor of $1/\sqrt{\epsilon_r}$ relative to the size of a resonator in the form of a waveguide cavity where $\epsilon_r$ is the dielectric constant of the dielectric material. Thus, the dielectric waveguide resonator is expected to find applications in small-sized low-loss filters in the microwave and millimeter wave ranges. When a dielectric waveguide filter of such a type is combined with a microstrip line or a similar circuit element, the coupling between the dielectric waveguide filter and the external circuit is achieved by means of a structure such as those shown in FIGS. 33–35. In the example shown in FIG. 33, a conducting film 2 is formed on the outer surface of a dielectric block 1 so that the middle part of the dielectric block 1 serves as a waveguide system with a high Q, and coaxial TEM resonators are formed at either end of the dielectric block 1. In the example shown in FIG. 34, a conducting film 2 and stubs 9 are formed on the outer surface of a dielectric block wherein the coupling to the waveguide resonator system and the coupling to an external microstrip line are achieved via the stubs 9. In the example shown in FIG. 35, a hole is formed in a particular side of a dielectric block 1, and a probe 10 is inserted into the hole thereby achieving coupling to a waveguide resonance mode.

In the above-described conventional structures of dielectric resonators which operate in the TE01δ, TM110, or TEM mode, the resonance frequency and unloaded Q can be rather easily set to desired values by properly selecting the external dimensions. However, these dielectric resonators have problems in design and production arising from their structure. That is, in the TE01δ-mode dielectric resonator, a complicated structure is required to dispose a dielectric resonator at a particular fixed location in a shield case. In the case of the TM110-mode dielectric resonator, it is not easy to connect a prism-shaped dielectric to a metallic case or a case covered with a conducting film through which a current flows. When the prism-shaped dielectric and the outer conductor are combined in an integral fashion, a complicated and difficult molding technique is required. Furthermore, it is required that an end of the case be open so as to process the prism-shaped dielectric in the case. When the resonator is used, it is required to cover the open end with a conductor. This causes an increase in the cost of the production and assembly process. On the other hand, in the case of a TEM-mode dielectric resonator, the outside dimensions should be great enough to obtain a high unloaded Q. However, if the outside dimensions are increased, the resonance frequency in a high-order resonance mode becomes close to the primary resonance frequency in the TEM mode to be used. Since only a certain number of dielectric materials are available in practical production, the unloaded Q is limited within a certain range. In the case where a band-pass filter is constructed of a dielectric block having a plurality of inner conductor holes and having a coupling hole formed in the middle of each inner conductor hole wherein the coupling between resonators is adjusted by properly selecting the effective dielectric constant between resonators, it is required that only the inner surface of each inner conductor hole be covered with an inner conductor while the inner surface of the coupling holes should remain uncovered. However, this requires a complicated production process.

It is also known in the art to construct a dielectric waveguide resonator by forming a conducting film on the outer surface of a ceramic dielectric. This structure is equivalent to a cavity resonator filled with a dielectric. If a dielectric with a dielectric constant of $\epsilon_r$ is employed, a reduction in wavelength occurs and thus it is possible to reduce the total size of the resonator by a factor equal to $1/\sqrt{\epsilon_r}$. FIG. 31 illustrates the structure of a TE101-mode dielectric waveguide resonator. The wavelength inside the resonator is given by $\lambda g = 2ac/\sqrt{a^2+c^2}$, and this wavelength determines the resonance frequency. The unloaded Q is determined by the wavelength λg, the skin depth δ of the conducting film formed on the surface of the dielectric, and the dimensions a, b, and c of the dielectric block wherein the unloaded Q increases with the dimensions a, b, and c. Although this type of dielectric waveguide resonator requires a greater size for the same resonance frequency than a coaxial dielectric resonator, it is easy to produce a resonator having a high unloaded Q. However, in this type of dielectric waveguide resonator, when the dielectric constant $\epsilon_r$ of the ceramic dielectric used and the main resonance frequency as well as adjacent resonance frequency are given, the dimensions a, b, and c of the resonator are determined by the given parameters and the unloaded Q is determined by the dimensions a, b, and c. This requires the dielectric constant $\epsilon_r$ of the dielectric material to be within the range around 20, from 30 to 35, or around 90. In practice, it is difficult to freely select the dielectric constant. Therefore, when a desired resonance frequency is achieved using a given dielectric material, the only parameter allowed to vary to adjust the unloaded Q is the dimension b. In this case, it is required to properly select the dimension b while taking into account the effect of the adjacent resonance frequency on the main resonance frequency. Thus, this type of resonator is difficult to design and adjust.

In view of the above, it is an object of the present invention to provide a dielectric waveguide resonator whose resonance frequency and unloaded Q can be designed in a more flexible fashion, and can be easily adjusted to desired values.

FIG. 33 illustrates the structure of a conventional dielectric waveguide filter. Although this type of dielectric waveguide filter can be easily coupled to a microstrip line, the coaxial resonator portions have a low unloaded Q relative to that of the waveguide resonator, and thus the overall unloaded Q becomes low. On the other hand, in the case of the structure shown in FIG. 34, it is required that the length of the stub 9 should be large enough to achieve strong coupling. However, the long stub 9 can cause leakage of electromagnetic waves via the gap between the stub 9 and the conducting film 2. The leakage of electromagnetic wave can cause interference in on an external circuit. In the structure shown in FIG. 35, it is required that a probe 10 should be prepared separately from the resonator. Furthermore, it is also required to securely fix the probe 10 relative to the dielectric block 1.

Thus, it is another object of the present invention to provide a dielectric waveguide resonator having a simple coupling circuit element by which coupling to an external circuit can be achieved without having to use an additional special member and without causing a great amount of leakage of electromagnetic waves toward the outside.

SUMMARY OF THE INVENTION

According to an aspect of the present invention, there is provided a dielectric waveguide resonator including a dielectric block whose outer surface is covered with a conducting film, the dielectric waveguide resonator being characterized in that a through-hole whose inner surface is not covered with a conducting film is formed in the dielectric block in such a manner that the through-hole extends from one face to another face of the dielectric block or a recess whose inner surface is not covered with a conducing film is formed on a particular face of the dielectric block thereby adjusting the resonance frequency and the unloaded Q. As a result of the formation of the through-hole or recess whose inner surface is not covered with a conducting film in the dielectric block, the dielectric constant in the through-hole or recess becomes different from that of the dielectric block and resultant perturbation effect on the electric field causes an increase in the resonance frequency. Therefore, this technique makes it possible to adjust the resonance frequency by properly selecting the size and/or location of the through-hole or recess while keeping the outside dimensions of the dielectric block constant. Thus, it is possible to set the resonance frequency and unloaded Q to desired values over wide ranges by properly designing the outside dimensions of the dielectric block and the size or location of the through-hole or recess. This makes it possible to design the unloaded Q in a more flexible fashion.

In the case of a dielectric waveguide resonator consisting of a rectangular dielectric block whose outer surface is covered with a conducting film, such as that shown in FIGS. 32A–32B, if the dielectric block has a dielectric constant $\in_r$ of 21, and the size thereof is given by a=23 mm, b=9 mm, and c=18 mm, then the resonance frequency fo becomes about 2.5 GHz. Although it is also possible to adjust the resonance frequency fo by removing a particular portion over an area of for example 2 mm square from the conducting film on a side face of the dielectric block as shown in FIG. 32B, a change in the resonance frequency fo as great as about 1000 ppm will occur when a metallic element is placed near the above removed portion of the conducting film. Such a great change of 1000 ppm in fo will result in a great change in the characteristics of the multi-stage filter. In contrast, in the case where a through-hole whose inner surface is not covered with a conducting film is formed in a dielectric block as shown in FIG. 32A, only a small change of about 100 ppm occurs in fo when a metallic element is placed near the open plane of the through-hole. Furthermore, in the case of the structure shown in FIG. 12B in which the conducting film on a side face is partially removed, about a 10% reduction occurs the unloaded Q. In contrast, substantially no change in the unloaded Q occurs in the case of the structure shown in FIG. 32A in which the through-hole whose inner surface is not covered with a conducting film is formed in the dielectric block.

According to another aspect of the present invention, the through-hole or recess is formed at a location at which the electric field distribution has a high electric strength in a particular resonance mode. This makes it possible to produce a relatively great change in the resonance frequency by forming a small through-hole or recess. This technique also makes it possible to design the unloaded Q within an expanded range.

When a resonator can have a plurality of resonance modes, it is possible to construct a plurality of dielectric resonators with a single dielectric block by utilizing the individual resonance modes, and it is also possible to combine these resonance modes to realize a filter. For example, when the dielectric resonator has first and second resonance modes, if the through-hole or recess is formed at a location at which the electric field strength in the second resonance mode is greater than that in the first resonance mode, it is possible to adjust selectively only the resonance frequency in the second resonance mode relative to the resonance frequency in the first resonance mode even in the case where the resonance frequencies in the first and second resonance modes are close to each other. Thus, this technique makes it easy to adjust the difference in resonance frequency between two resonance modes. According to another aspect of the present invention, the through-hole or recess is preferably formed at a location at which the electric field strength in the first resonance mode is nearly equal to that in the second resonance mode. In this case, the resonance frequencies in the first and second resonance modes are equally affected by the through-hole or recess and thus it is possible to simultaneously set the resonance frequencies in the two resonance modes to desired values simply by adjusting the single through-hole or recess.

In still another aspect of the present invention, the two resonance modes may be degenerated by forming the dielectric block into a rectangular block shape in which at least two opposite side faces are squares, or into a solid circular cylinder or hollow circular cylinder.

If the through-hole or recess is formed in a direction along the electric field in a particular resonance mode, it is possible to enhance the perturbation effect on the electric field. Furthermore, if the through-hole or recess is formed into a tapered shape or a stepped shape, it becomes easy to make coarse and fine adjustments on the resonance frequency by properly forming the through-hole or recess.

Although the through-hole or recess may be hollow (that is filled with air), a dielectric material having a dielectric constant different from that of the dielectric block may also be placed in the through-hole or recess.

In a further aspect of the invention, the opening end of the through-hole or recess is covered with a conductor thereby ensuring that leakage of electromagnetic waves toward the outside or unwanted electromagnetic coupling with an external circuit is prevented.

According to another aspect of the present invention, there is provided a dielectric waveguide filter including a dielectric block whose outer surface is covered with a conducting film, the dielectric waveguide filter being characterized in that a terminal electrode isolated from the conducting film is formed on the outer surface of the dielectric block and a hole is formed in the dielectric block wherein a coupling electrode is formed on the inner surface of the hole in such a manner that one end of the coupling electrode is connected to the terminal electrode and the other end of the coupling electrode is connected to the conducting film. This makes it possible to reduce the leakage of electromagnetic waves toward the outside without having to use an additional special member. In this structure a coupling loop is formed by the coupling electrode and the conducing film disposed on the outer surface of the dielectric block, thereby providing magnetic coupling to a resonance mode of the dielectric waveguide resonator occurs.

According to another aspect of the invention, a terminal electrode isolated from the conducting film is formed on the outer surface of the dielectric block and a hole is formed in the dielectric block wherein a coupling electrode is formed on the inner surface of the hole in such a manner that one end of the coupling electrode is connected to the terminal electrode and the other end of the coupling electrode is electrically open-circuited in the hole. In this structure, the coupling electrode serves to provide coupling to the electric field in a resonance mode of the dielectric waveguide resonator. In any of these structures described above, a connection to an external circuit element such as a microstrip line can be made via the terminal electrode formed on the outer surface of the dielectric block wherein the terminal electrode is connected to one end of the coupling electrode. The above connection can be achieved without having to insert an additional special member such as a probe into the hole from the outside. Furthermore, this structure provides excellent coupling to the external circuit element without producing leakage of electromagnetic waves toward the outside.

According to still another aspect of the invention, the above-described hole includes a hole extending in a substantially straight line and a hole intersecting the former hole. This makes it possible to form a coupling electrode in a flexible fashion in the dielectric block.

According to another aspect of the invention, a hole whose inner surface is not covered with a conducting film is formed in the dielectric block and a pin-shaped conductor covered with an insulating material is inserted in the above hole so that coupling with an external circuit is achieved via the pin-shaped conductor. Thus, this technique allows a simplification of the structure of the dielectric block and also allows easier coupling to the external circuit.

According to still another aspect of the invention, a slot whose inner surface is covered with a conducting film is formed in the dielectric block so that the slot acts as a node by which the dielectric block is divided along the direction of its length. This technique makes it possible to realize a multi-stage dielectric waveguide filter with a single dielectric block.

According to another aspect of the invention, there is provided a method of adjusting the characteristics of dielectric waveguide filter, including the step of partially removing the coupling electrode, which is formed on the inner surface of the hole, thereby adjusting the amount of coupling to an external circuit. In this method, it is possible to easily adjust the amount of coupling to the external circuit simply by partially removing the coupling electrode without having to use an additional special adjustment member and without producing leakage of electromagnetic waves toward the outside.

According to still another aspect of the invention, there is provided a method of adjusting the characteristics of dielectric waveguide filter, including the step of partially removing the inner surface of the through-hole or recess.

Other features and advantages of the invention will be understood from the following detailed description of embodiments thereof and the accompanying drawings, in which like references illustrate like elements and parts.

BRIEF DESCRIPTION OF THE DRAWINGS

FIG. 16 is a cross-sectional of the dielectric waveguide filter according to the 15th embodiment of the invention;

FIGS. 17A, 17B and 17C are respectively, schematic diagrams illustrating an example of a resonance mode which can occur in the dielectric waveguide filter according to the 15th embodiment of the invention;

DESCRIPTION OF THE PREFERRED EMBODIMENTS

Figure 1A:
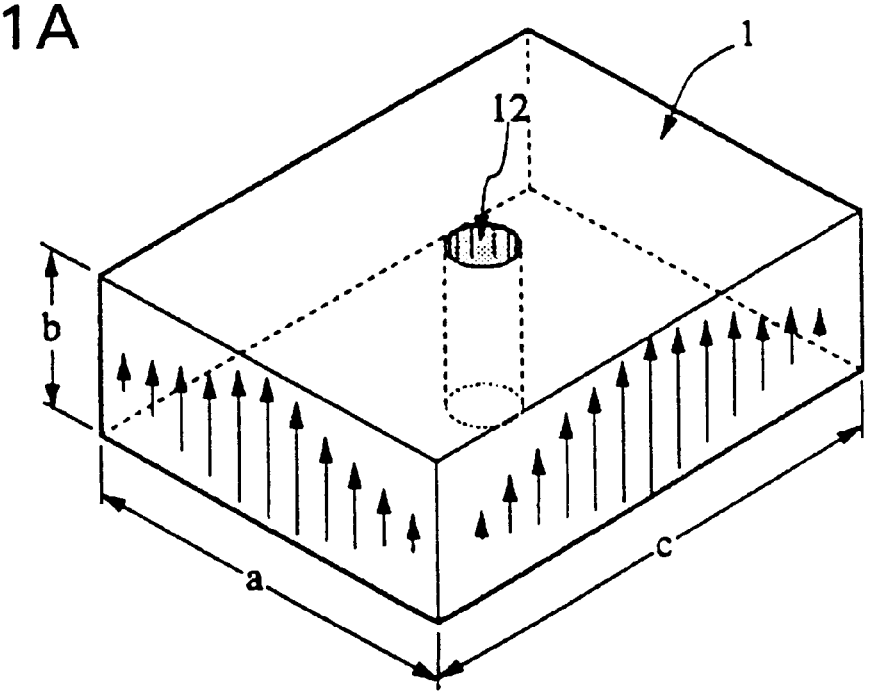
FIGS. 1A and 1B are respectively, a perspective view and a cross-sectional view illustrating the construction of a dielectric resonator according to a 1st embodiment of the invention.
Figure 1B:
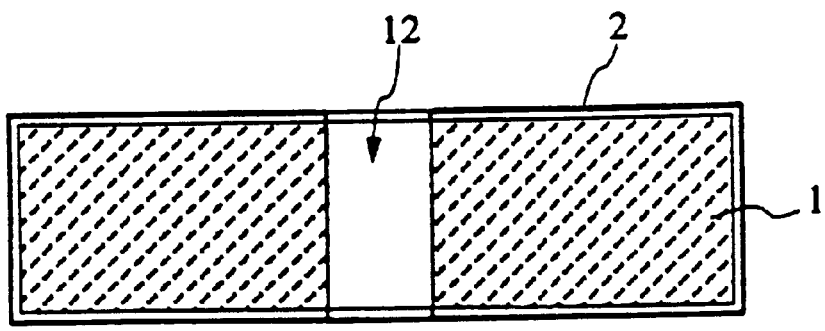

FIGS. 1A and 1B illustrate the construction of a dielectric waveguide resonator (hereinafter referred to simply as a dielectric resonator) according to a 1st embodiment of the present invention, wherein FIG. 1A is a perspective view illustrating its external appearance and FIG. 1B is a cross-sectional view thereof. Reference numeral 1 denotes a dielectric block in a substantially rectangular form. A circular through-hole 12 is formed in the center of the dielectric block 1 and a conducting film 2 is formed on the outer surface (six side faces) of the dielectric block 1. In FIG. 1A, the arrows drawn on the sides of the dielectric block 1 represent the projections of the electric field distribution inside the dielectric block 1 (in the central portion or near the central portion) onto the two sides of the dielectric block 1. The actual internal electric field distribution is similar to that shown in FIG. 31 wherein the energy of electric field in the vertical direction in the figure increases with location toward the center of the dielectric block 1 and decreases with location toward the periphery of the dielectric block 1 (the electric field strength is represented by the length of the arrows). In the specific example shown in FIGS. 1A and 1B, however, the dielectric block 1 has the through-hole 12 at its center, and thus the electric field strength inside the through-hole 12 is reduced since the dielectric constant inside the through-hole 12 is lower than that of the dielectric block 1.

Figure 31:
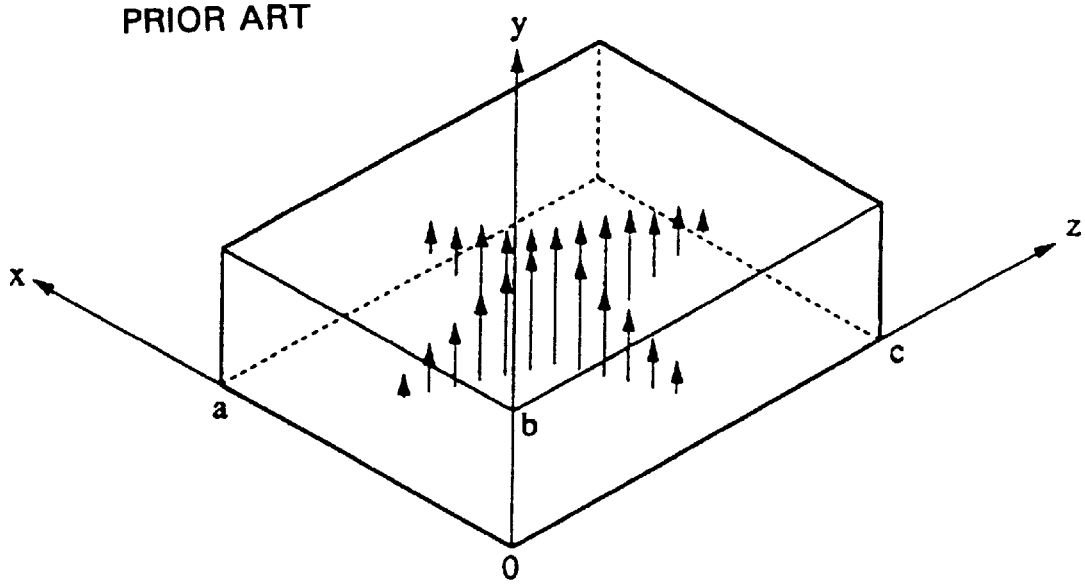
FIG. 31 is a schematic diagram illustrating the structure of a conventional dielectric waveguide resonator.
Figure 33:
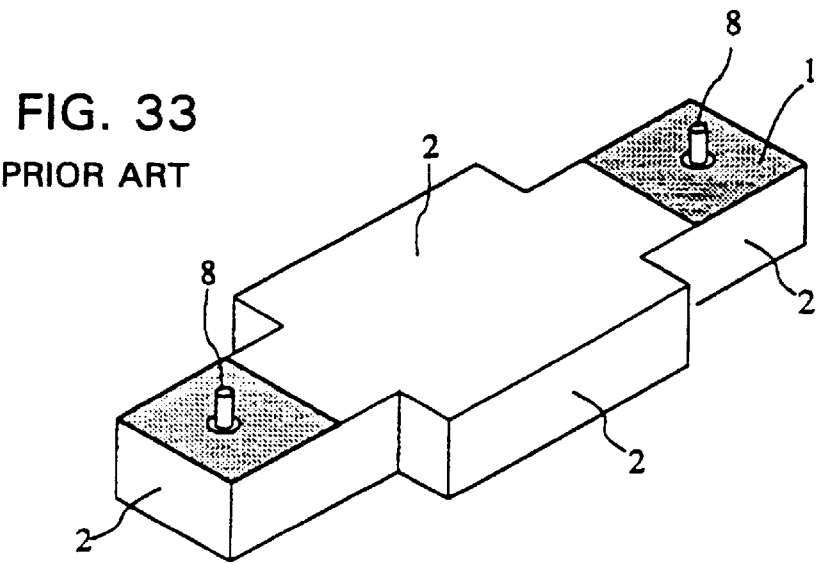
FIG. 33 is a perspective view illustrating the structure of a mechanism for coupling to an external circuit, provided on a dielectric waveguide resonator according to a conventional technique.
Figure 32A:
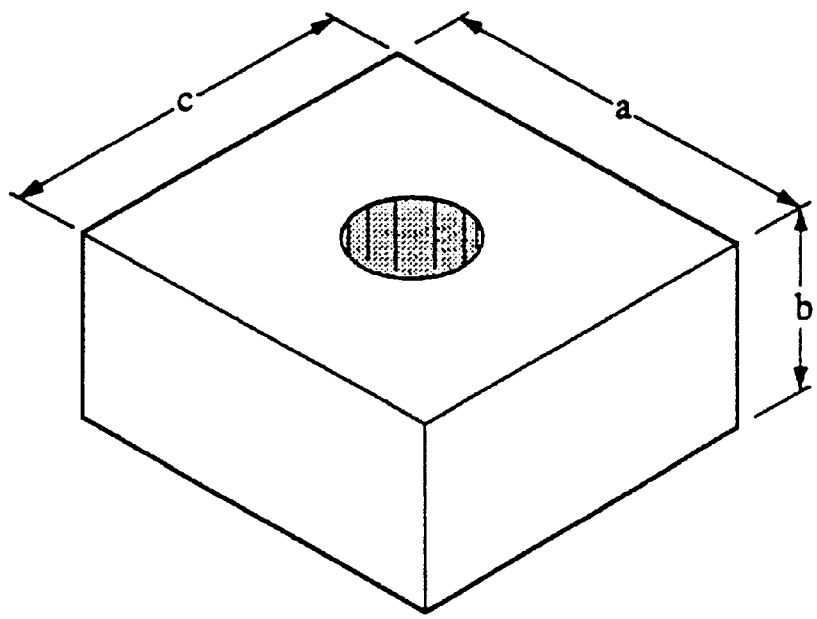
FIGS. 32A and 32B are perspective views illustrating respective examples of the structure of a dielectric waveguide resonator.
Figure 32B:
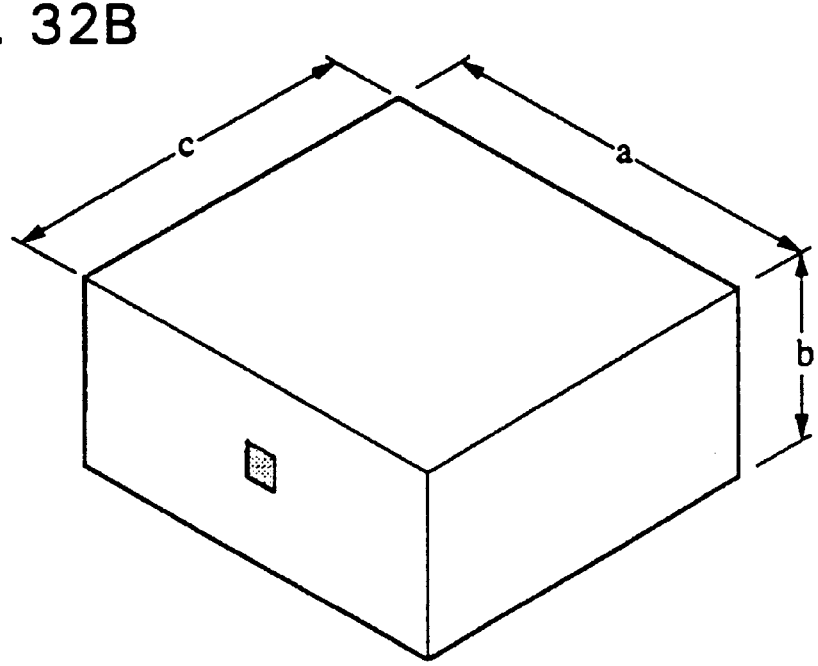
Figure 34:
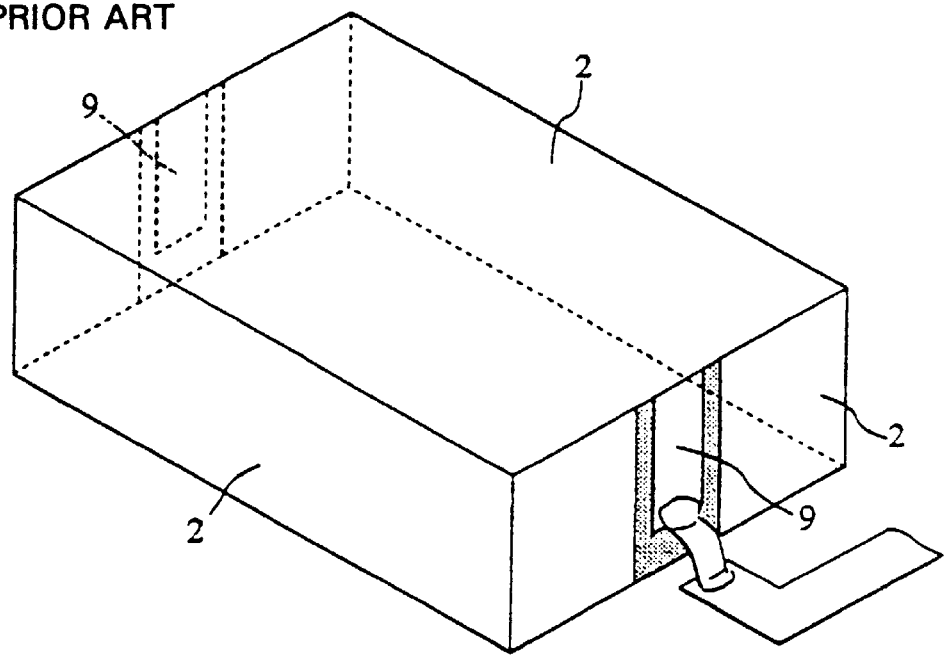
FIG. 34 is a perspective view illustrating the structure of another mechanism for coupling to an external circuit, provided on a dielectric waveguide resonator according to a conventional technique.
Figure 35:
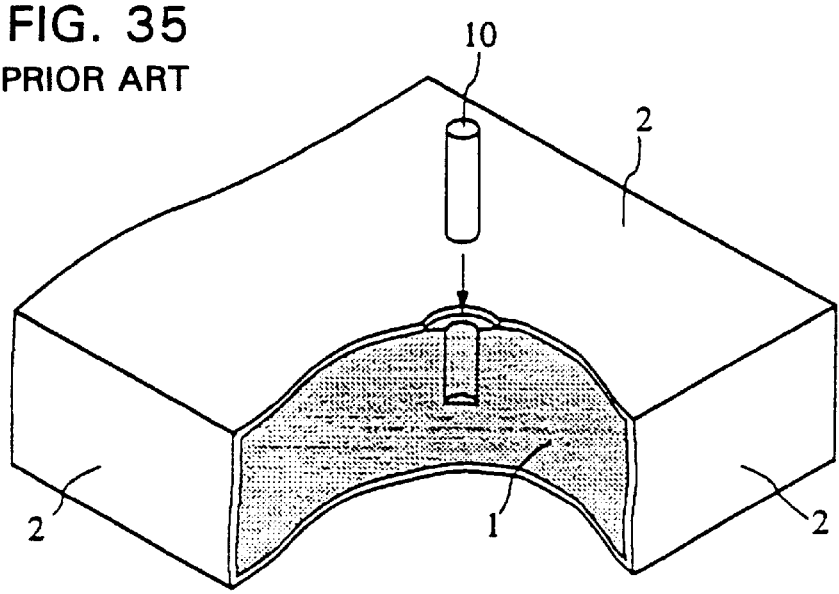
FIG. 35 is a partially cutaway perspective view illustrating the structure of a mechanism for coupling to an external circuit, provided on a dielectric waveguide resonator according or a conventional technique.

If the coordinate system is represented in a similar manner to that in FIG. 31, the dielectric resonator shown in FIGS. 1A and 1B has a TE101 resonance mode. The outside dimensions a, b, and c of the dielectric block 1 are selected so that the dielectric block 1 has a desired unloaded Q and has a resonance frequency which is close to but lower than a desired value. The internal diameter of the through-hole 12 is set so that the overall resonance frequency becomes the desired value. The through-hole 12 may be formed when the dielectric block 1 is molded, or may be formed by means of drilling before firing the rectangular dielectric ceramic. Otherwise, after firing the dielectric ceramic, the conducting film 2 is formed and then the through-hole 12 is formed by means of cutting.

Although not shown in FIGS. 1A and 1B, signal input/output means may also be provided on the dielectric resonator in such a manner that a hole is formed in the dielectric block 1 at a location corresponding to a probe and the inner surface of the hole is covered with a conducting film, or in such a manner that one end face of the dielectric block is formed to serve as an electrically open-circuited end and a driving microstrip line is formed on that end face.

Figure 2:
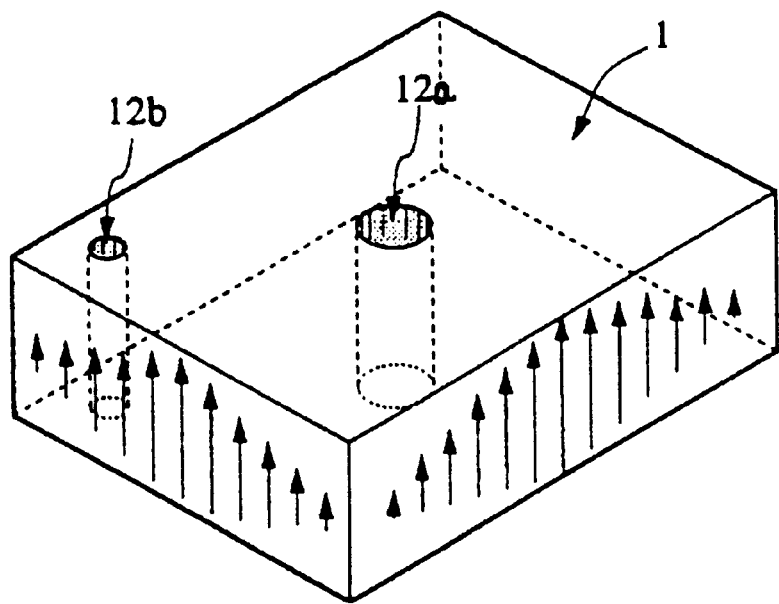
FIG. 2 is a perspective view illustrating the construction of a dielectric resonator according to a 2nd embodiment of the invention.

FIG. 2 is a perspective view illustrating the appearance of a dielectric resonator according to a 2nd embodiment of the invention. As shown in FIG. 2, the dielectric resonator has a through-hole 12a, similar to the through-hole 12 shown in FIGS. 1A and 1B, formed in the center of a dielectric block where the electric field has a great value. The dielectric resonator further has a through-hole 12b formed near an end of the dielectric block 1 where the electric field has a rather low value. The formation of the through-hole 12b with a small inner diameter at a location where the electric field has a low value makes it possible to easily make a fine adjustment of the resonance frequency.

Figure 3:
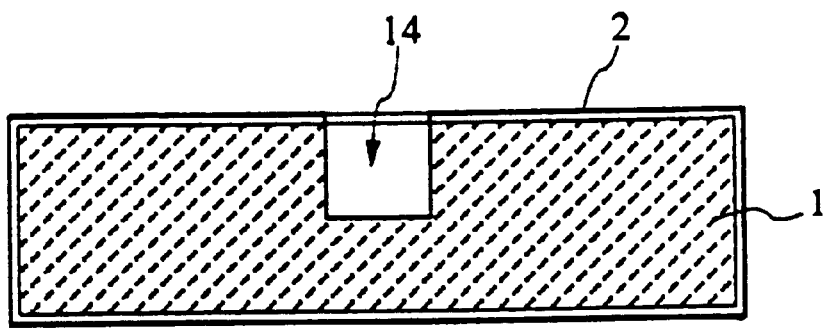
FIG. 3 is a cross-sectional view illustrating the construction of a dielectric resonator according to a 3rd embodiment of the invention.

FIG. 3 is a cross-sectional view of a dielectric resonator according to a 3rd embodiment of the invention. Unlike the dielectric resonator shown in FIGS. 1A–1B, a recess 14 is formed in a dielectric block 1 wherein the recess 14 does not extend fully through the dielectric block 1. In this structure, the resonance frequency may be adjusted not only by the inner diameter of the recess 14 but also by the depth of the recess 14. In addition to the recess 14 formed on the upper surface of the dielectric block 1, another recess may be formed on the lower surface of the dielectric block 1 so as to form a ridge-type dielectric resonator.

Figure 4:
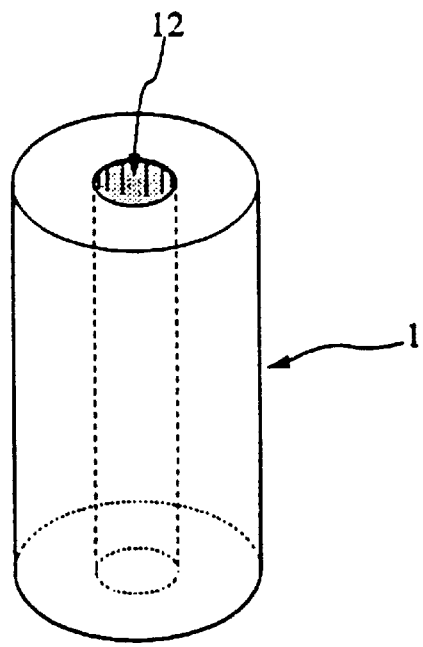
FIG. 4 is a perspective view illustrating the construction of a dielectric resonator according to a 4th embodiment of the invention.

FIG. 4 is a perspective view of a dielectric resonator according to a 4th embodiment of the invention. As is the case in this 4th embodiment, the dielectric block 1 is not limited to a rectangular structure but may also be constructed into the form of a solid circular cylinder or a hollow circular cylinder, wherein the unloaded Q and an approximate resonance frequency are determined by the external dimensions of the circular cylinder and the resonance frequency is adjusted to a final desired value by forming a through-hole 12.

Figure 5:
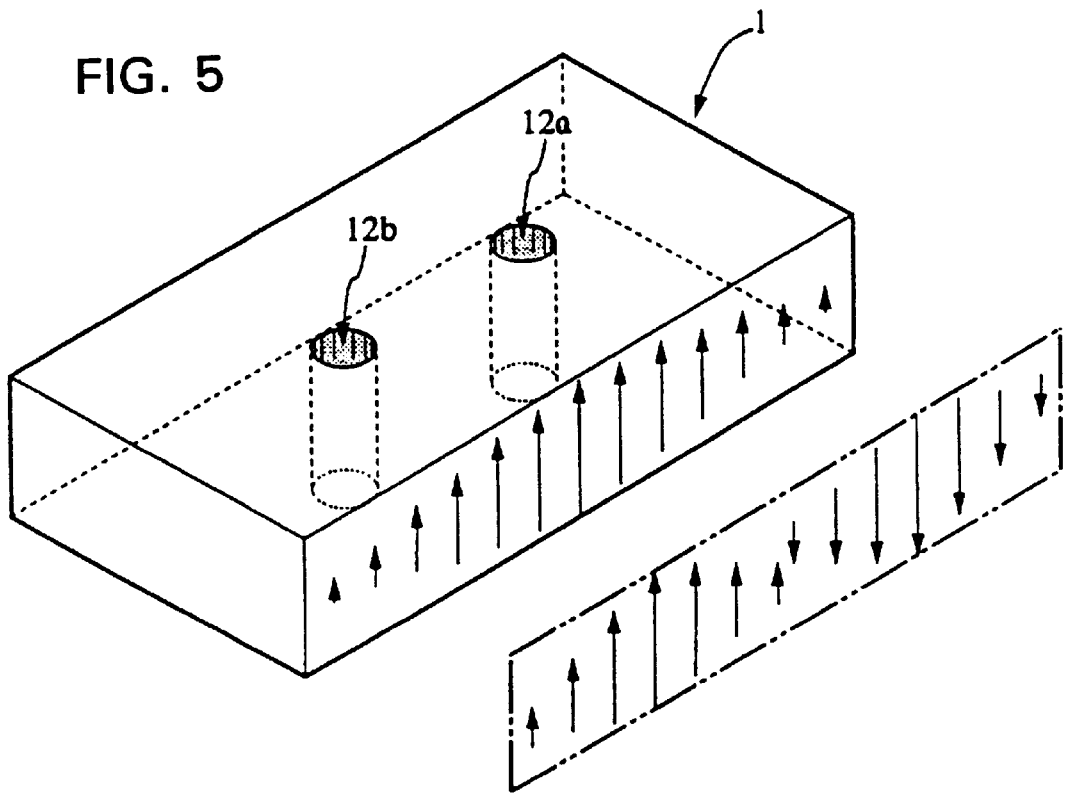
FIG. 5 is a perspective view illustrating the construction of a dielectric resonator according to a 5th embodiment of the invention.

FIG. 5 is a schematic diagram illustrating the structure of a dielectric resonator according to a 5th embodiment of the invention. This dielectric resonator has two resonance modes wherein the electric field in the first resonance mode has a distribution such as that represented by the projection onto a side of a dielectric block 1 while the projection of the electric field in the second resonance mode onto the side of the dielectric block 1 is shown by another separate representation. Through-holes 12a and 12b are formed at locations where the electric field strength has a similar value and thus these through-holes 12a and 12b have a similar perturbation effect on the two resonance mode. This means that the resonance frequency can be adjusted at the same time for both the first and second resonance modes. Although in the specific example shown in FIG. 5 two through-holes are formed, only one through-hole may be formed at either side.

Figure 6:
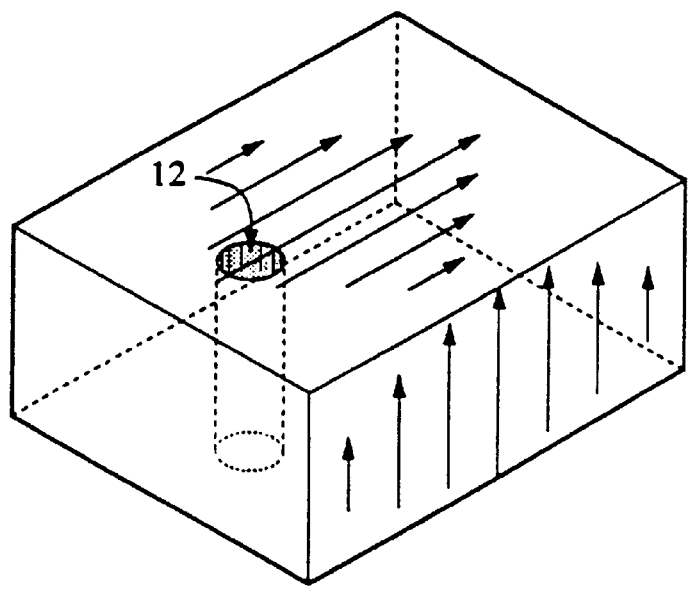
FIG. 6 is a perspective view illustrating the construction of a dielectric resonator according to a 6th embodiment of the invention.

In the dielectric resonator having two resonance modes shown in FIG. 5, if a through-hole is formed in the center of the dielectric block 1, then that through-hole will increase the resonance frequency in the first mode. However, substantially no change occurs in the resonance frequency in the second resonance mode, because the through-hole in the center of the dielectric block 1 has little perturbation effect on the resonance frequency in the second resonance mode. Conversely, if a through-hole is formed at a location where the electric field strength has a large value for the second resonance mode while the electric field strength has a low value for the first resonance mode, then the through-hole has a greater perturbation effect on the electric field in the second resonance mode and a smaller perturbation effect on the electric field in the first resonance mode, and therefore the formation of the through-hole results in an increase in the resonance frequency in the second resonance mode with substantially no increase in the resonance frequency in the first resonance mode. As described above, it is possible to selectively control the resonance frequency in a particular resonance mode of a plurality of resonance modes by properly selecting the location of a through-hole FIG. 6 is a schematic diagram illustrating the structure of a dielectric resonator according to a 6th embodiment of the invention. In FIG. 6, arrows drawn on a side of a dielectric block 1 represent the distribution of the electric field in a first resonance mode while arrows drawn on the upper surface of the dielectric block 1 represent the distribution of the electric field in a second resonance mode. In FIG. 6, the representation of the electric field distributions is given in a simplified fashion wherein the first resonance mode is for example a TE111 mode and the second resonance mode is for example a TM111 mode, and these two resonance modes are degenerated. In this embodiment, a through-hole 12 is formed at a properly selected location in a properly-selected direction so that the resonance frequency is selectively controlled for either first or second resonance mode, or otherwise at the same time for both the first and second resonance modes.

Figure 7A:
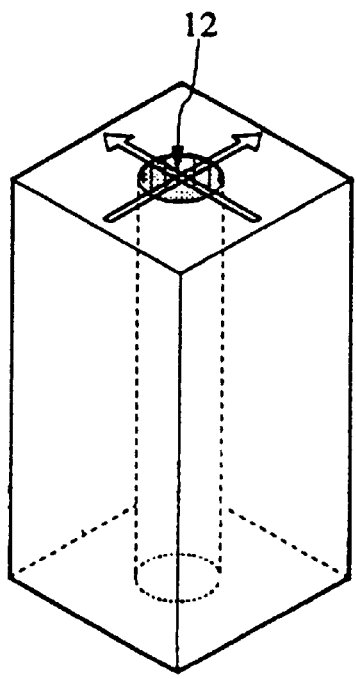
FIGS. 7A and 7B are respectively, perspective views illustrating the construction of a dielectric resonator according to a 7th embodiment of the invention and a modification thereof.
Figure 7B:
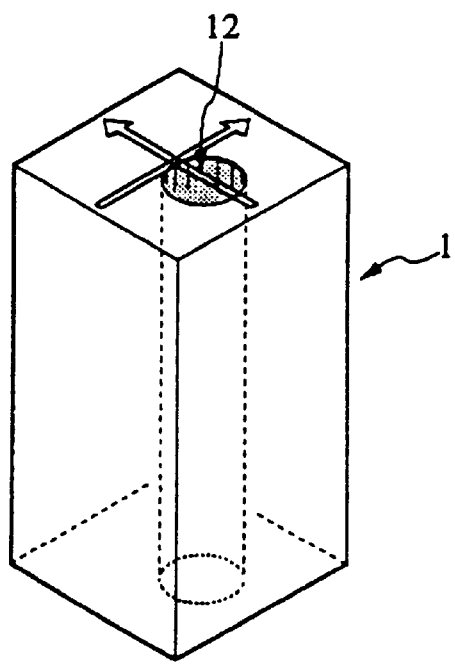

FIGS. 7A–7B illustrate the structure of a dielectric resonator according to a 7th embodiment of the invention. The dielectric resonator consists of a dielectric block 1 in the form of a rectangular block having upper and lower square-shaped surfaces. The six faces of the dielectric block 1 are all covered with a conducting film. Arrows drawn on the upper surface of the dielectric block 1 represent the directions of the electric field for first and second resonance modes wherein both the first and second resonance modes are in TE101 modes and thus these two resonance modes are degenerated. Therefore, the resonance frequencies in the above two modes are equal to each other. (In FIGS. 7A–7B, the horizontal directions are defined as the x and y directions and the vertical direction is defined as the z direction.) When a through-hole 12 is formed in the center of the dielectric block 1 along the z direction as shown in FIG. 7A, the through-hole 12 has the same perturbation effect on the two resonance modes, and thus the same change occurs in the resonance frequency in both resonance modes. On the other hand, as shown in FIG. 7B, if the through-hole 12 is formed at a location shifted from the center, there will be a difference in the perturbation effect on the electric field between the two resonance modes and therefore there will be a difference in the resonance frequency between the two resonance modes. As a result, the degeneracy is resolved and the two resonance modes are coupled to each other.

Figure 8:
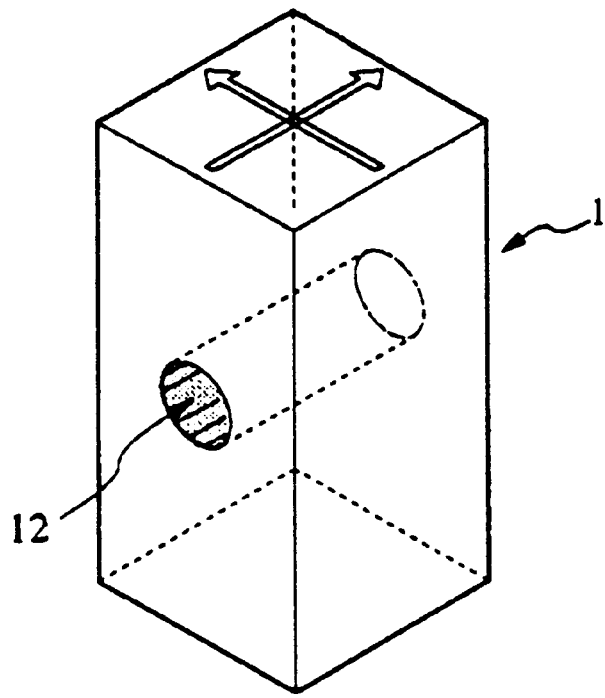
FIG. 8 is a perspective view illustrating the construction of a dielectric resonator according to an 8th embodiment of the invention.

FIG. 8 is a perspective view of a dielectric resonator according to an 8th embodiment of the invention. In this 8th embodiment, unlike the structure shown in FIGS. 7A–7B, a through-hole 12 is formed in a direction crossing a pair of rectangular surfaces. In this structure, the through-hole 12 has a greater perturbation effect on a resonance mode in which the electric field has a component in a direction parallel to the through-hole 12 than on the other resonance mode, and the two resonance modes are coupled to each other. The coupling strength between the two resonance modes is set to a desired value by properly selecting the size and the location of the through-hole 12.

Figure 9:
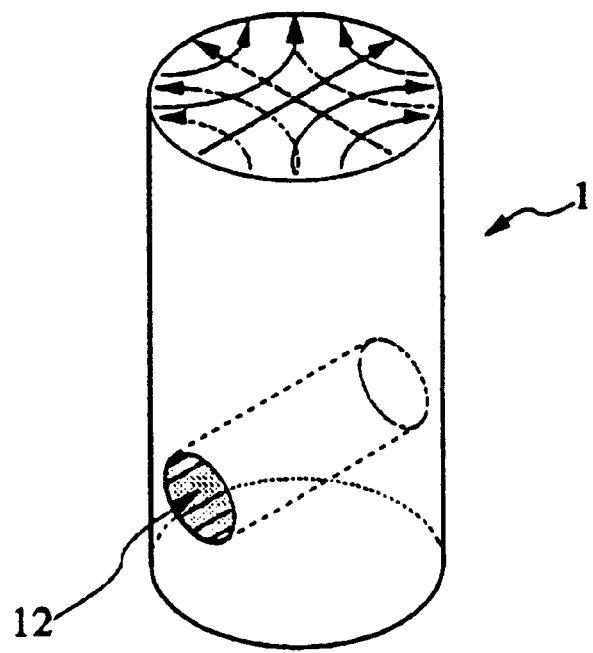
FIG. 9 is a perspective view illustrating the construction of a dielectric resonator according to a 9th embodiment of the invention.

FIG. 9 is a schematic diagram illustrating the structure of a dielectric resonator according to a 9th embodiment of the invention. If a conducting film is formed on the outer surface of a dielectric block 1 in a circular cylinder form such as that shown in FIG. 9, there will be two resonance modes (in a TE111 mode) in which electric fields are distributed in such a manner as represented by the projection of the lines of force onto the upper surface of the dielectric block 1 (wherein both solid and broken lines of force represent the distribution of the electric field). If a through-hole 12 is formed in the dielectric block along the z axis, the through-hole 12 has a greater perturbation effect on a resonance mode in which the electric field has a component in a direction along the through-hole 12 than on the other resonance mode. This produces a difference in resonance frequency between the two resonance modes, and the two resonance modes are coupled to each other.

Figure 10:
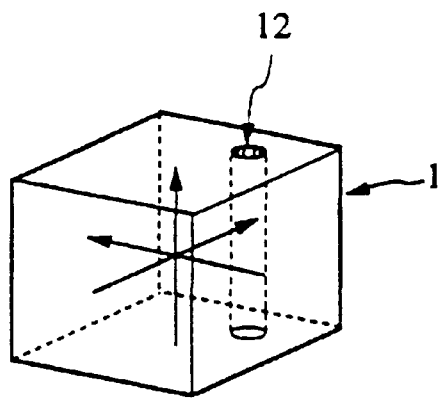
FIG. 10 is a perspective view of a dielectric resonator according to a 10th embodiment of the invention.

FIG. 10 is a schematic diagram illustrating the structure of a dielectric resonator according to a 10th embodiment of the invention. This dielectric resonator consists of a dielectric block 1 in the form of a cubic whose six faces are covered with a conducting film. In this structure, there can be three resonance modes each having an electric field component in a direction along one of three axes denoted by arrows in FIG. 10 wherein these three resonance modes are degenerated. If a through-hole 12 is formed in the dielectric resonator having such the structure, the through-hole 12 has a greater perturbation effect on a resonance mode in which the electric field has a component in a direction along the through-hole 12 than on the other two resonance modes. As a result, the above resonance mode has a resonance frequency different from that in the other two resonance modes.

Figure 11A:
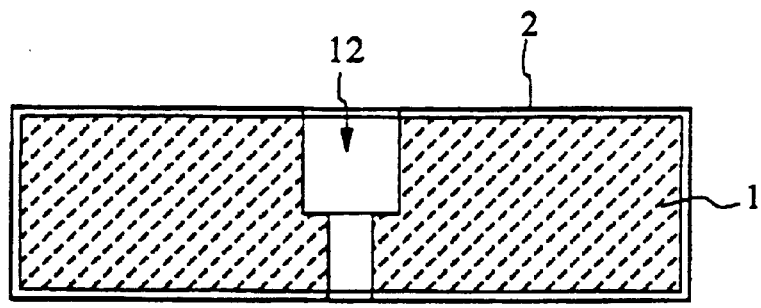
FIGS. 11A and 11B are respectively, cross-sectional views of a dielectric resonator according to a 11th embodiment of the invention and a modification thereof.
Figure 11B:
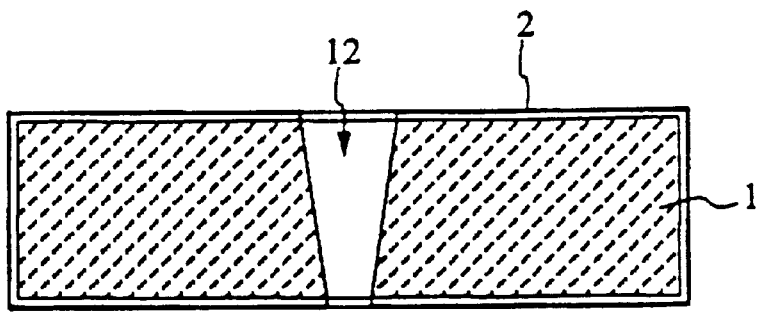

FIGS. 11A–11B are cross-sectional views of a dielectric resonator according to an 11th embodiment of the invention. Although in the embodiments described above the through-hole of the dielectric resonator is formed in a circular shape, the through-hole 12 may also be formed in such a manner that the inner diameter of the through-hole 12 varies in a stepping fashion with the location along the depth direction as shown in FIG. 11A, or may be formed in a tapered fashion in which the inner diameter of the through-hole 12 gradually varies with the location along the depth direction as shown in FIG. 11B. In this case, the resonance frequency is roughly determined by a portion of the through-hole having a greater inner diameter and is finely adjusted by a portion having a smaller inner diameter.

Figure 12A:
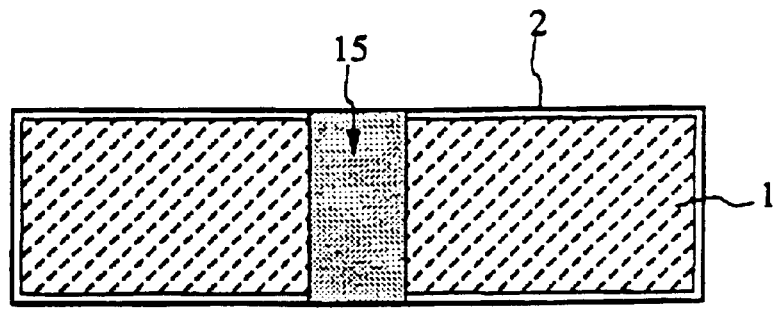
FIGS. 12A and 12B are respectively, cross-sectional views of a dielectric resonator according to a 12th embodiment of the invention and a modification thereof.
Figure 12B:
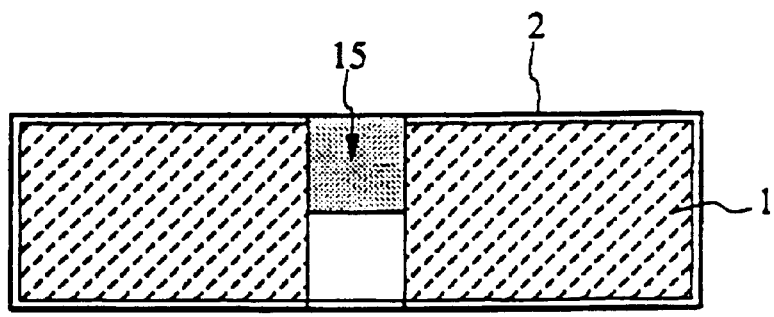

FIGS. 12A–12B are cross-sectional views of a dielectric resonator according to a 12th embodiment of the invention. In the structure shown in FIG. 12A, the inside of the through-hole is filled with a dielectric 15. Alternatively, as shown in FIG. 12B, the inside of the through-hole may be partially filled with a dielectric 15. When the dielectric constant of the dielectric 15 filled in the through-hole is greater than the dielectric constant of the dielectric block 1, the filling of the dielectric 15 results in a reduction in the resonance frequency. If the resonance frequency is maintained at a fixed value, the dielectric 15 makes it possible to reduce the total size of the dielectric resonator. The resonance frequency of the resonator is determined by the overall characteristics of the whole elements including the dielectric 15. For example, if the dielectric 15 has a different frequency-temperature characteristic from that of the dielectric block 1, then the frequency-temperature characteristic of the resonator is determined by the overall frequency-temperature characteristic of the combination of the dielectric 15 and the dielectric block 1. Therefore, it is possible to easily improve the temperature characteristic by properly selecting the dielectric materials so that the frequency-temperature characteristic of the dielectric block 1 is compensated for by the frequency-temperature characteristic of the dielectric 15.

Figure 13:
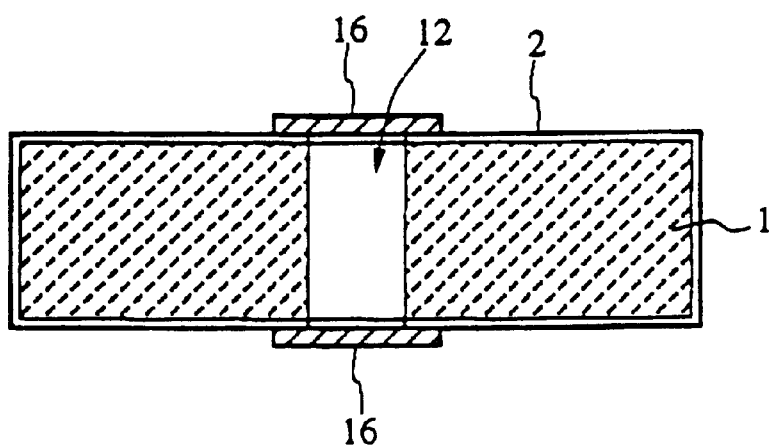
FIG. 13 is a cross-sectional view of a dielectric resonator according to a 13th embodiment of the invention.

FIG. 13 is a cross-sectional view of a dielectric resonator according to a 13th embodiment of the invention. As shown in FIG. 13, the open ends of the through-holes 12 are covered with a conductor such as copper foil 16 fixed and connected via soldering to the conducting film 2. The conductors 16 serve to prevent leakage of electric field from the inside to the outside of the through-hole 12 and thus cutting off the electromagnetic coupling to an external circuit.

Figure 14:
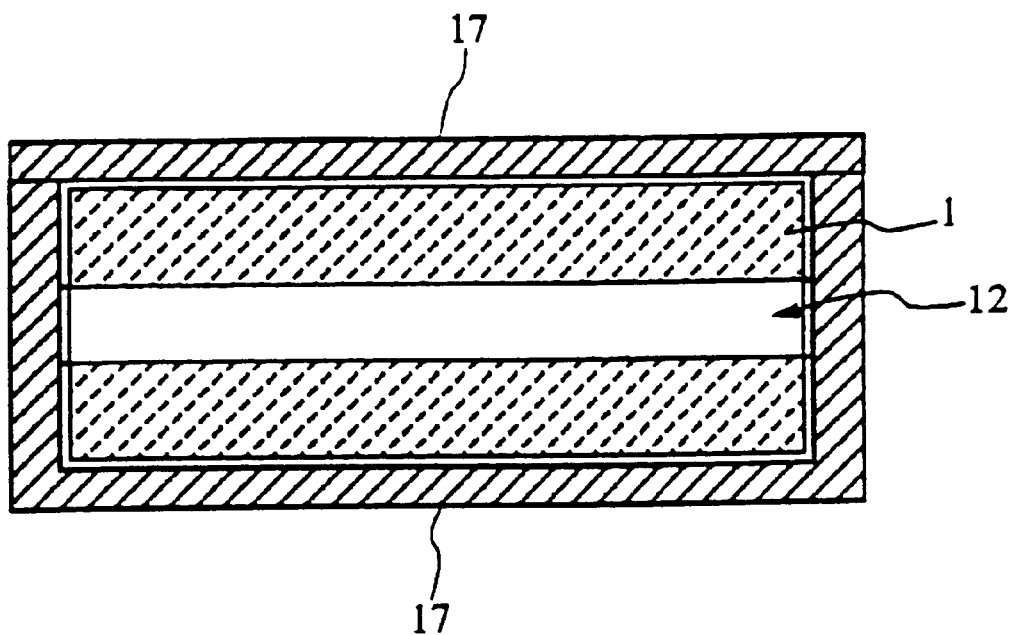
FIG. 14 is a cross-sectional view of a dielectric resonator according to a 14th embodiment of the invention.

FIG. 14 is a cross-sectional view of a dielectric resonator according to a 14th embodiment of the invention. Unlike the structure shown in FIG. 13 in which conductors are provided so that only the open ends of the through-holes are covered with the conductors, the dielectric resonator of the present embodiment is placed, as shown in FIG. 14, in a case 17 so that the whole dielectric resonator is shielded.

Now referring to FIGS. 15A–17C, the structure of a dielectric waveguide filter according to a 15th embodiment of the invention will be described below.

Figure 15A:
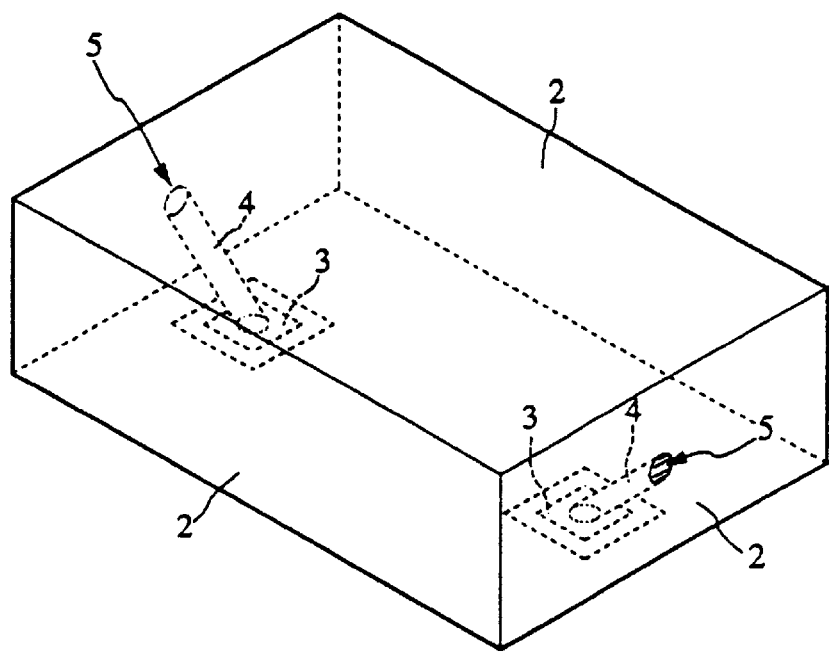
FIGS. 15A and 15B are respectively, perspective views of a dielectric waveguide filter according to a 15th embodiment of the invention.
Figure 15B:
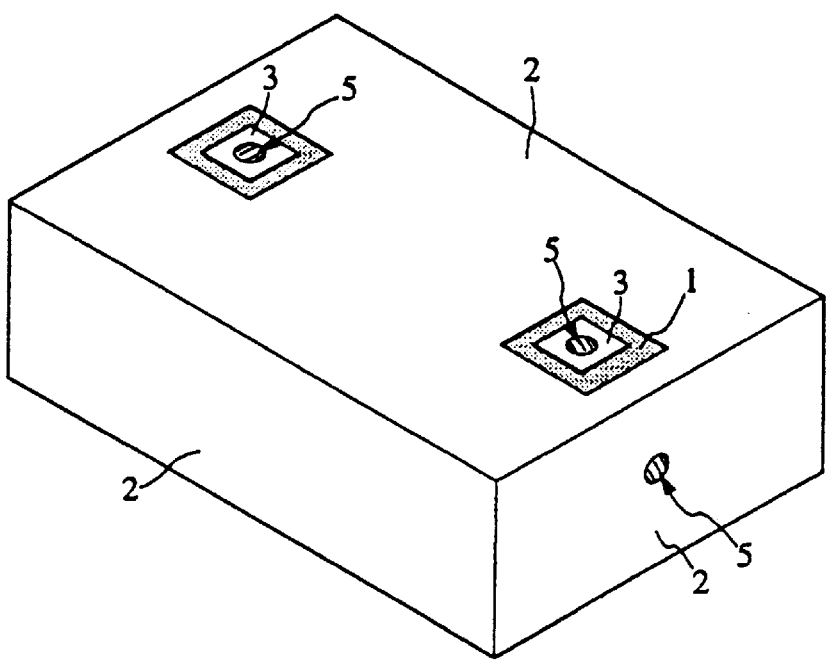

FIGS. 15A–15B are perspective views of the dielectric waveguide filter wherein FIG. 15A is a perspective view of the dielectric waveguide filter mounted on a circuit board and FIG. 15B is a perspective view of the dielectric waveguide filter placed in an upside-down fashion. Two through-holes 5 extending in slanted directions are formed in a rectangular dielectric block 1 and a coupling electrode 4 is formed on the inner surface of each through-hole 5. The majority area of the outer surface of the dielectric block 1 is covered with a conducting film 2 and two terminal electrodes 3 are disposed on the outer surface of the dielectric block 1 such that the two terminal electrodes 3 are isolated from the conducting film 2. One end of the coupling electrode 4 formed on the inner surface of each through-hole 5 is connected to the corresponding terminal electrode 3 and the other end of the coupling electrode is connected to the conducting film 2. FIG. 16 illustrates a cross section extending through the two through-holes shown in FIG. 15A. FIGS. 17A, 17B and 17C schematically illustrate a resonance mode wherein FIGS. 17A, 17B, and 17C are a top view, front view, and side view thereof, respectively. Arrows and dots denote electric fields and broken lines denote magnetic fields. In this specific example, resonance occurs in a TE101 mode in which coupling mainly to a magnetic component in the resonance mode occurs via a coupling loop formed by the coupling electrodes 4 and the conducting film 2 on the outer surface of the dielectric block.

The through-holes 5 shown in FIGS. 15A–15B may be formed when the dielectric ceramic is molded, or may be formed by means of drilling after completion of the molding process or after firing the dielectric ceramic. The conducting film 2, coupling electrodes 4, and terminal electrodes 3 may be formed by depositing a conducting film over the entire surface of the dielectric ceramic by means of a dipping or plating technique, and then patterning the deposited conducting film by means of etching. Alternatively, the patterns of the conducting film 2 and terminal electrodes 3 may also be formed directly by means of screen printing using a material such as silver paste.

Figure 18:
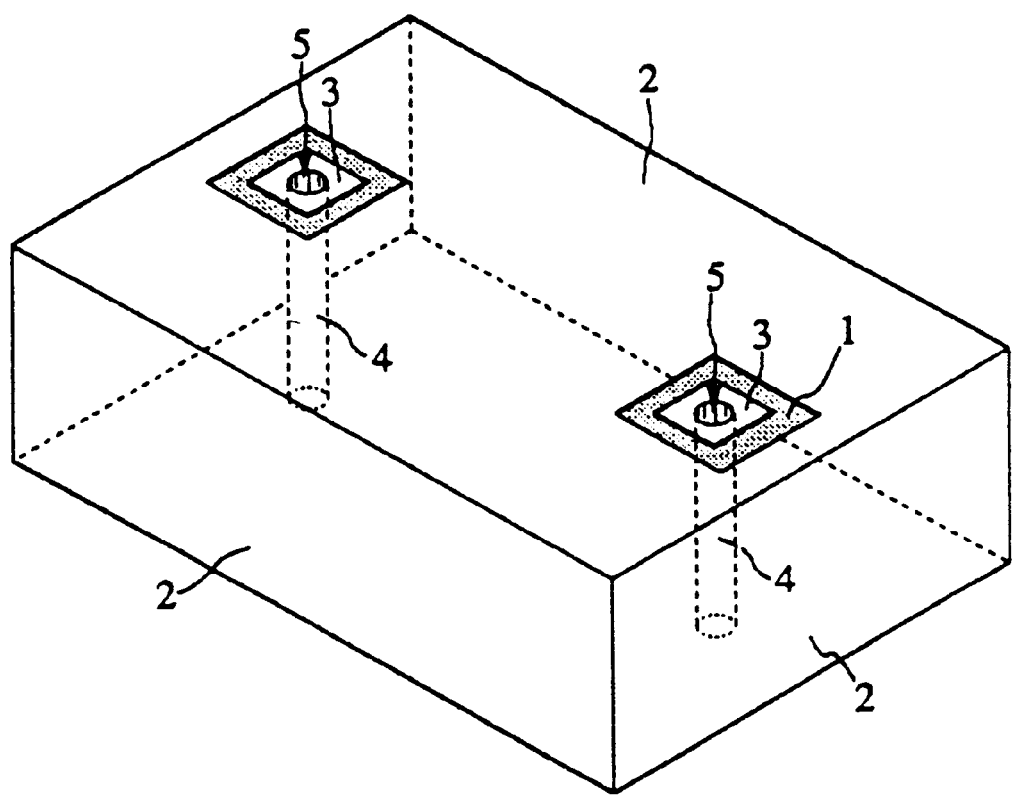
FIG. 18 is a perspective view of a dielectric waveguide filter according to a 16th embodiment of the invention.

FIG. 18 is a perspective view of a dielectric waveguide filter according to a 16th embodiment of the invention. Unlike the 15th embodiment, two through-holes 5 extending in a vertical direction are formed in a dielectric block and a coupling electrode 4 is formed on the inner surface of each through-hole 5 wherein one end of each coupling electrode 4 is connected to a corresponding terminal electrode 3 formed on the outer surface of the dielectric block 1 and the other end of each coupling electrode 4 is connected to a conducting film 2 formed on the outer surface of the dielectric block 1. With this structure, a coupling loop is formed by the coupling electrodes 2 and the conducting film 4 wherein the coupling loop provides magnetic coupling with a TE101 resonance mode.

Figure 19A:
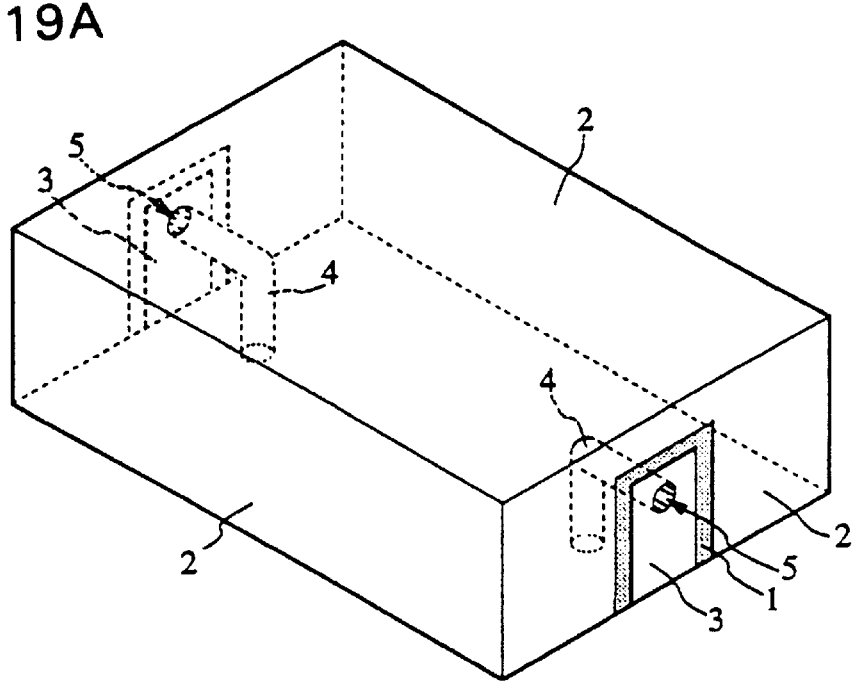
FIGS. 19A and 19B are respectively, perspective views of a dielectric waveguide filter according to a 17th embodiment of the invention.
Figure 19B:
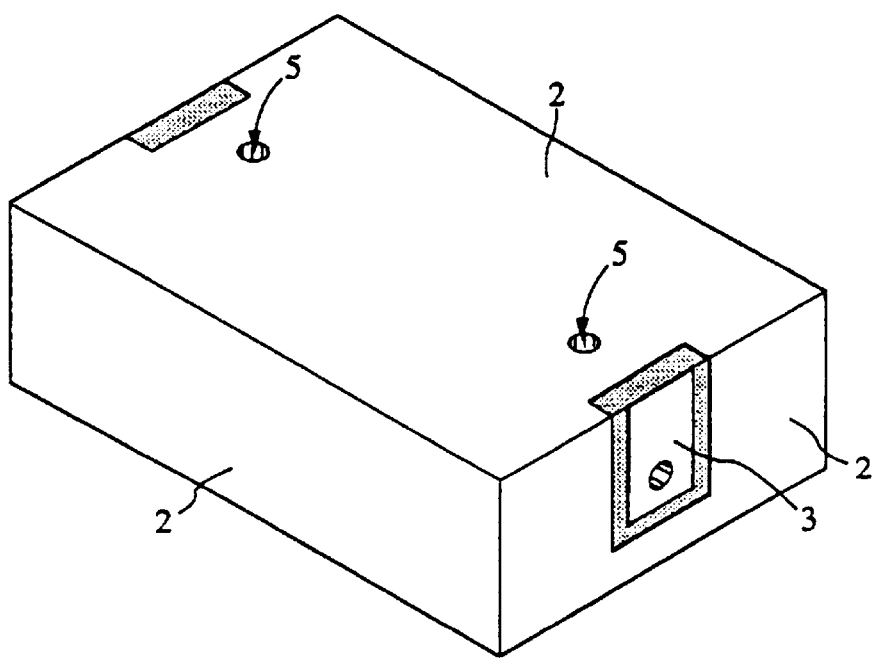

FIGS. 19A–19B are perspective views of a dielectric waveguide filter according to a 17th embodiment of the invention, wherein FIG. 19A is a perspective view of the dielectric waveguide filter mounted on a circuit board and FIG. 19B is a perspective view of the dielectric waveguide placed in an upside-down fashion. In this embodiment, L-shaped through-holes 5 are formed in a dielectric block 1 and a coupling electrode 4 is formed on the inner surface of each L-shaped through-hole 5. A conducting film 2 is formed on the outer surface of the dielectric block 1, and a terminal electrode 3 is formed on each of two opposing side faces of the dielectric block 1 in such a manner that each terminal electrode 3 is isolated from the conducting film 2. One end of each coupling electrode 4 is connected to the corresponding terminal electrode 3 and the other end is connected to the conducting film 2. Also in this embodiment, a coupling loop is formed by the coupling electrodes 2 and the conducting film 2 wherein the coupling loop provides magnetic coupling with a TE101 resonance mode.

The through-holes 5 shown in FIGS. 19A–19B may be formed by means of so-called lost-wax technique in which after molding a dielectric ceramic together with L-shaped wax, the L-shaped wax is removed during a firing process.

Figure 20A:
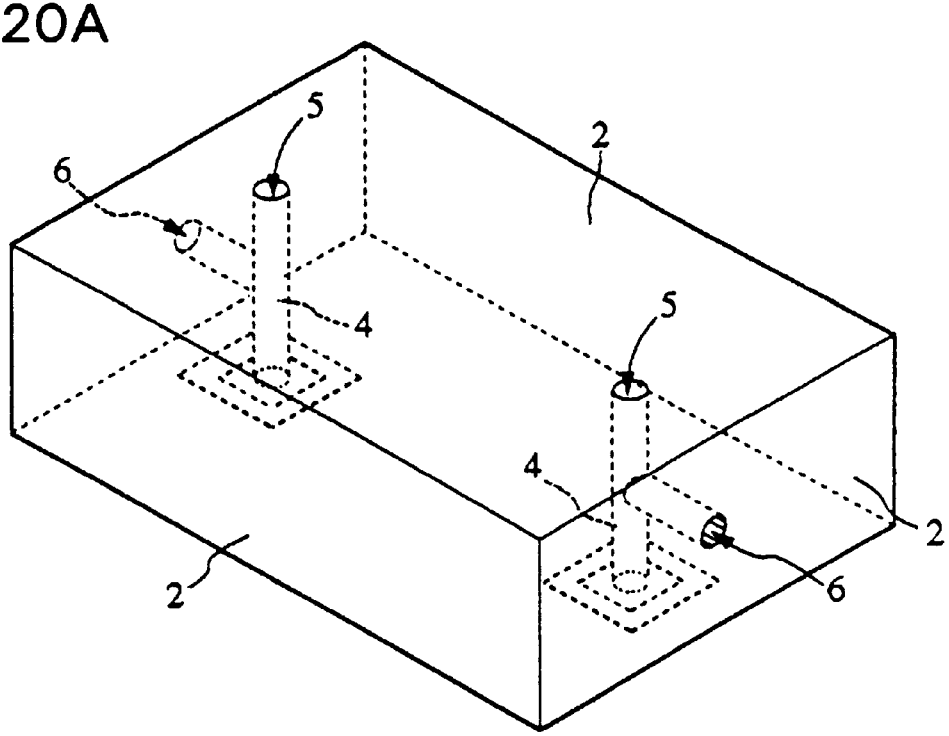
FIGS. 20A and 20B are respectively, a perspective view and a cross-sectional view of a dielectric waveguide filter according to an 18th embodiment of the invention.
Figure 20B:
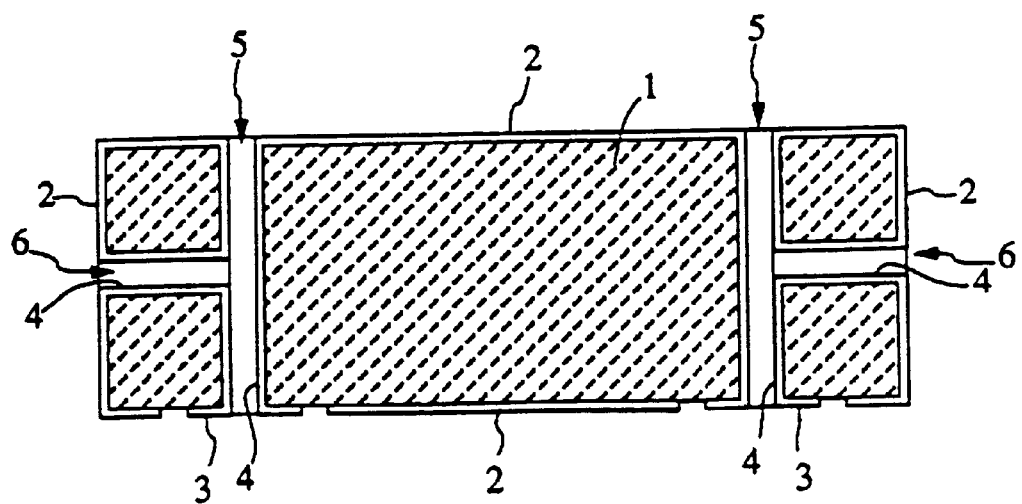

FIGS. 20A and 20B are a perspective view and a cross-sectional view of a dielectric waveguide filter according to an 18th embodiment of the invention. Two vertical through-holes 5 are formed in a dielectric block 1 wherein each vertical through-hole 5 is connected to a horizontal hole 6 extending in a direction perpendicular to the vertical through-holes 5. A conducting film 2 and terminal electrodes 3 are formed on the outer surface of the dielectric block 1. Coupling electrodes 4 are formed on the inner surfaces of the respective through-holes 5 and holes 6. One end of each coupling electrode 4 formed on the inner surface of each through-hole 5 is connected to the corresponding terminal electrode 3, and the other end is connected to the conducting film 2. The outer end of each coupling electrode 4 formed on the inner surface of each hole 6 is connected to the conducting film 2. In this structure, the loop area of the coupling loop formed by the coupling electrodes 4 and the conducting film 2 is determined by the height at which the holes 6 are formed, and thus the amount of coupling to an external circuit can be controlled by adjusting the height at which the holes 6 are formed.

Now referring to FIGS. 21A, 21B, 22A, 22B and 23, other possible structures of dielectric waveguide filters and methods of adjusting the characteristics thereof will be described below.

Figure 21A:
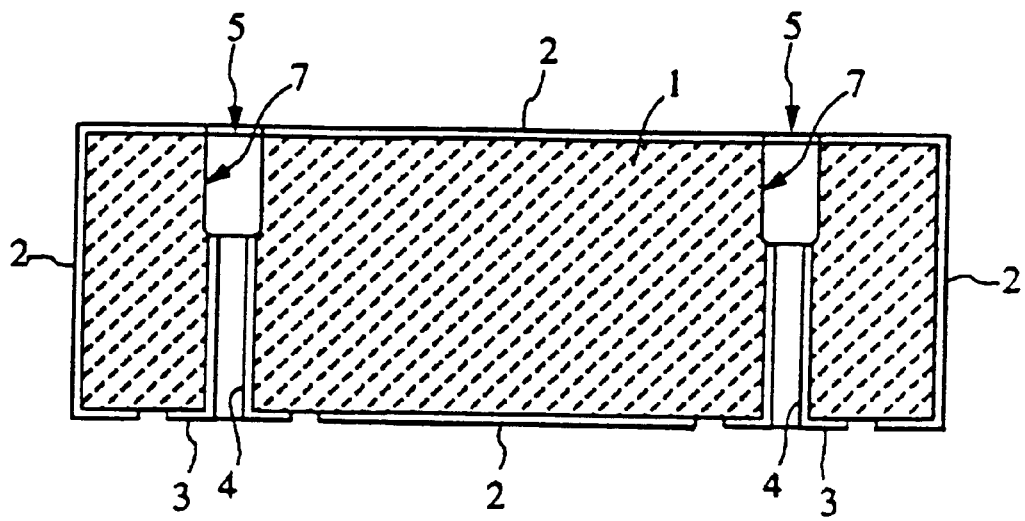
FIGS. 21A and 21B are respectively, cross-sectional views illustrating the structure of a dielectric waveguide filter and a method of adjusting the characteristics thereof, according to a 19th embodiment of the invention.
Figure 21B:
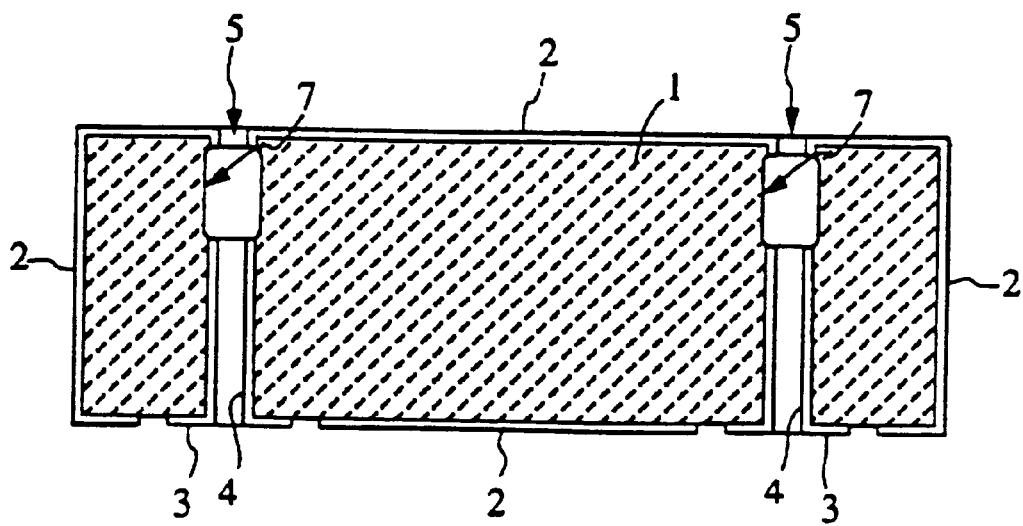

FIGS. 21A and 21B are cross-sectional views illustrating the structure of a dielectric waveguide filter and a method of adjusting the characteristics thereof, according to a 19th embodiment of the invention. As in the dielectric waveguide filter shown in FIG. 18, two vertical through-holes 5 are formed in a dielectric block 1 and a coupling electrode 4 is formed on the inner surface of each vertical through-hole 5. One end of each coupling electrode 4 is connected to a corresponding one of terminal electrodes 3 formed on the outer surface of the dielectric block 1. In a specific example shown in FIG. 21A, a hole with a constant diameter is formed in each through-hole 5 of the dielectric block by cutting the upper portion of each through-hole 5 down to a predetermined depth using a rotating grindstone or the like. In the case of an example shown in FIG. 21B, cutting is performed so that an inner portion of each through-hole 5 is expanded in diameter. In the present embodiment, the upper ends of the coupling electrodes 4 are isolated from the conducting film 2 by the above-described cutaway portions 7 formed in the respective through-holes 5 so that the upper ends of the coupling electrodes 4 are electrically open-circuited and thus the coupling electrodes 4 serve as probes. In this structure, coupling mainly to the electric field in a resonance mode occurs via the coupling electrodes 4. Therefore, in this embodiment, the characteristics are adjusted by properly controlling the cutting amount (depth) of the cutaway portions 7 thereby controlling the length of the coupling electrodes 4 thus adjusting the amount of coupling.

Figure 22A:
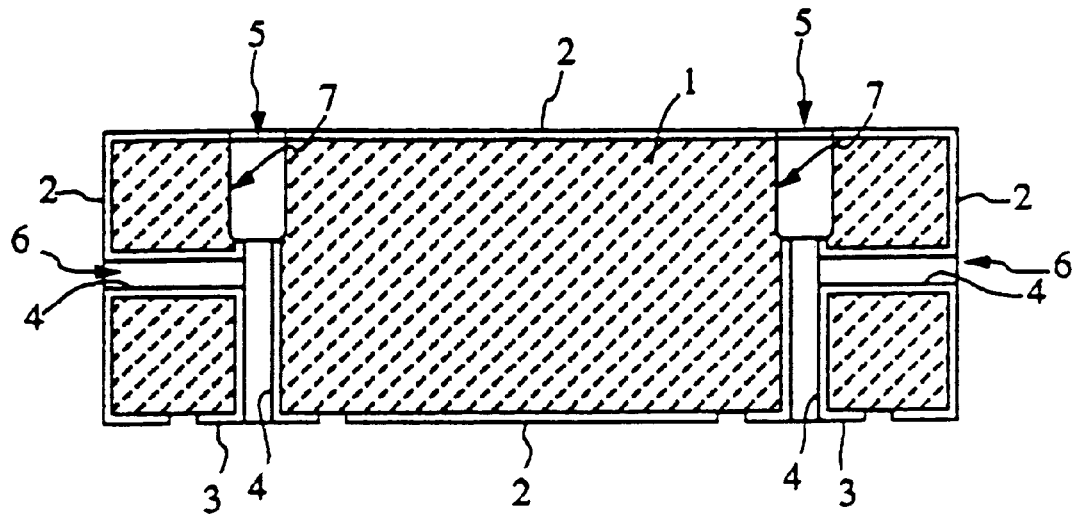
FIGS. 22A and 22B are respectively, cross-sectional views illustrating the structure of a dielectric waveguide filter and a method of adjusting the characteristics thereof, according to a 20th embodiment of the invention.
Figure 22B:
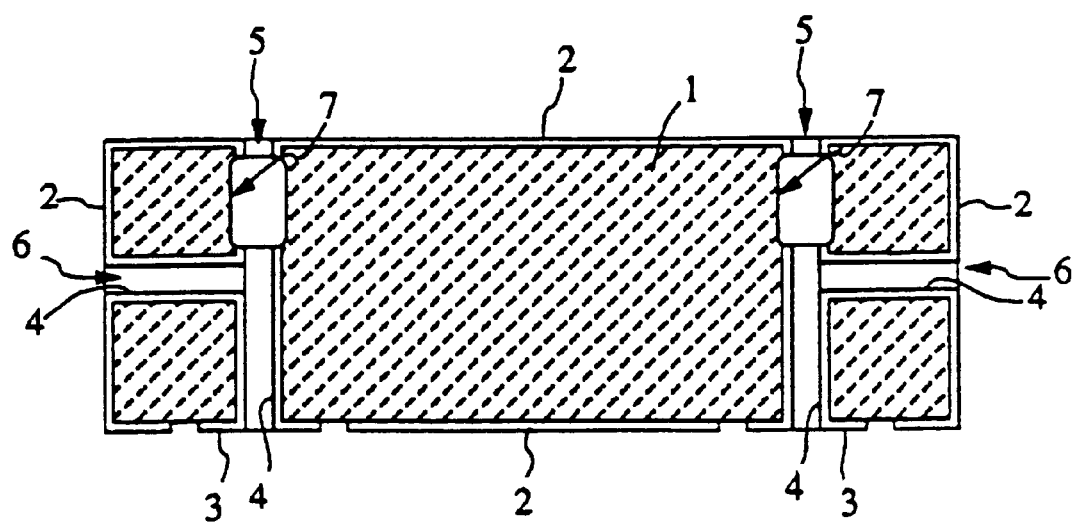

FIGS. 22A and 22B are cross-sectional views illustrating the structure of a dielectric waveguide filter and a method of adjusting the characteristics thereof, according to a 20th embodiment of the invention. As in the dielectric waveguide filter shown in FIGS. 20A–20B, two vertical through-holes 5 are formed in a dielectric block 1 wherein each vertical through-hole 5 is connected to a horizontal hole 6 extending in a direction perpendicular to the vertical through-holes 5. A conducting film 2 and terminal electrodes 3 are formed on the outer surface of the dielectric block 1. Coupling electrodes 4 are formed on the respective inner surfaces of the through-holes 5 and the holes 6. One end of each coupling electrode 4 formed on the inner surface of each through-hole 5 is connected to the corresponding terminal electrode 3, and the outer end of each coupling electrode 4 formed on the inner surface of each hole 6 is connected to the conducting film 2. In a specific example shown in FIG. 22A, a hole with a constant diameter is formed in each through-hole 5 of the dielectric block by cutting the upper portion of each through-hole 5 to a predetermined depth using a rotating grindstone or the like. In the case of an example shown in FIG. 22B, cutting is performed so that an inner portion of each through-hole 5 is expanded in diameter. Thus, in this embodiment, a similar structure to that of the dielectric waveguide filter shown in FIGS. 19A–19B is obtained by forming a cutaway portion 7. The amount of electromagnetic coupling with the resonance mode is controlled by properly selecting the cutting amount of the cutaway portions 7 thereby adjusting the amount of coupling with an external circuit.

Figure 23:
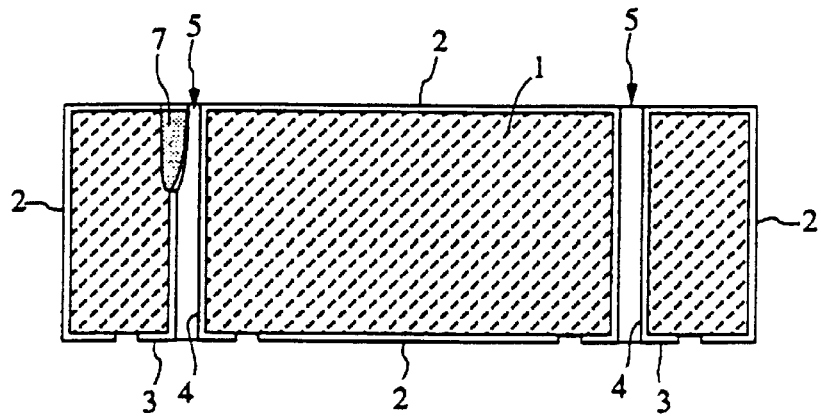
FIG. 23 is a cross-sectional view illustrating the structure of a dielectric waveguide filter and a method of adjusting the characteristics thereof, according to a 21st embodiment of the invention.

FIG. 23 is a cross-sectional view illustrating a method of adjusting the characteristics of a dielectric waveguide filter according to a 21st embodiment of the invention. In this filter structure, as in the structure shown in FIG. 18, two through-holes 5 are formed in a dielectric block so that the through-holes 5 extend in a direction parallel to a shorter axis of the dielectric block, and a coupling electrode 4 is formed on the inner surface of each through-hole 5 wherein one end of each coupling electrode 4 is connected to a corresponding terminal electrode 3 formed on the outer surface of the dielectric block 1 and the other end of each coupling electrode 4 is connected to a conducting film 2 formed on the outer surface of the dielectric block 1. In this specific example, a cutaway portion 7 is formed by cutting the upper portion of the through-hole 5 thereby partially removing the coupling electrode 4 together with a part of the dielectric block 1. Since the one end of each coupling electrode still remains connected to the conducting film 2, a coupling loop is formed by the coupling electrodes 4 and the conducting film. However, the partial removal of the coupling electrode 4 causes a change in the shape of the coupling electrode 4, which in turn causes a change in the amount of electrical coupling to a resonance mode via the coupling electrode 4. Thus, it is possible to adjust the amount of coupling by controlling the shape and amount of the cutaway portion 7.

In addition to the above-described structures of dielectric waveguide filters and the methods of adjusting the characteristics thereof, further structures and methods are also possible. For example, in the structure shown in FIGS. 19A–19B, L-shaped probes may be formed by cutting the open end portions of the coupling electrodes 4 (the portions connected to the conducting film) in such a manner as to partially remove the open end portions or inner portions of the coupling electrodes 4. Similarly, in the structure shown in FIGS. 22A–22B, L-shaped probes may be formed by partially removing the open end portions or inner portions of the coupling electrodes 4. Since the amount of electromagnetic coupling to a resonance mode varies with the removal amount, it is possible to adjust the amount of coupling to an external circuit.

Although the TE101 resonance mode is used in the specific examples described above, the above-described methods and structures may also be employed when filters are operated in higher-order resonance modes.

Now referring to FIGS. 24–30, some structures to realize a dielectric waveguide filter consisting of a plurality of resonator stages will be described below.

Figure 24:
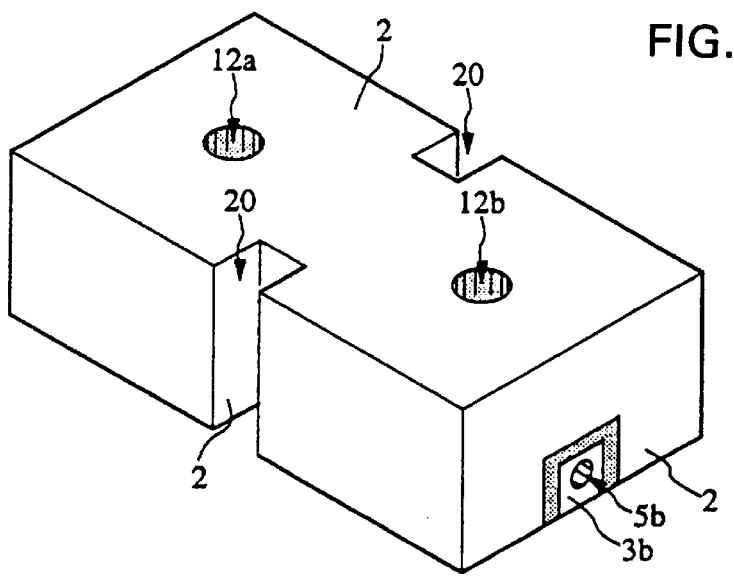
FIG. 24 is a perspective view of a dielectric waveguide filter according to a 22nd embodiment of the invention.
Figure 25:
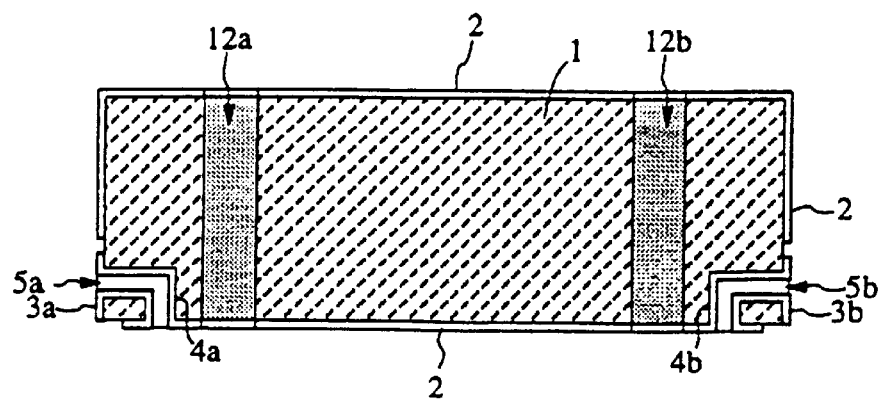
FIG. 25 is a cross-sectional view of the dielectric waveguide filter according to the 22nd embodiment of the invention.

FIG. 24 is a perspective view of a dielectric waveguide filter according to a 22nd embodiment of the invention wherein a cross section thereof is shown in FIG. 25. As shown in these figures, the dielectric waveguide filter is constructed of a dielectric block in the form of a generally rectangular prism whose outer surface is covered with a conducing film 2. In the middle of the dielectric block 1 in the longitudinal direction, there are slots 20 serving as a node by which the dielectric block 1 is divided into a plurality of sections along the longitudinal direction. The inner surface of each slot 20 is covered with the conducting film 2. Each section separated by the slots 20 serves as a resonator. A through-hole 12a or 12b is formed in each resonator section in such a manner that the through-hole extends through the dielectric block in a direction along the shortest axis. No conducting film is formed on the inner surface of the through-holes 12a and 12b. Terminal electrodes 3a and 3b are formed on side faces of the dielectric block. Through-holes 5a and 5b are formed in the dielectric block in such a manner that they extend from the corresponding terminal electrode 3a or 3b on the side faces of the dielectric block 1 to the conducting film on the bottom face of the dielectric block 1. Furthermore, a coupling electrode 4a or 4b is formed on the inner surface of each through-hole 5a and 5b. This structure serves as a two-stage band-pass dielectric waveguide filter wherein the two terminal electrodes 3a and 3b act as input and output terminals, respectively. The characteristics of the filter are determined by the resonance frequencies of two stages of resonators wherein the resonance frequencies of two stages of resonators are determined by the inner diameters of the through-holes 12a and 12b. The size and location of each through-hole 12a and 12b may be determined at the stage of design, or the inner surfaces of the through-holes 12a and 12b may be partially removed by proper amounts at the stage of adjustment.

Figure 26:
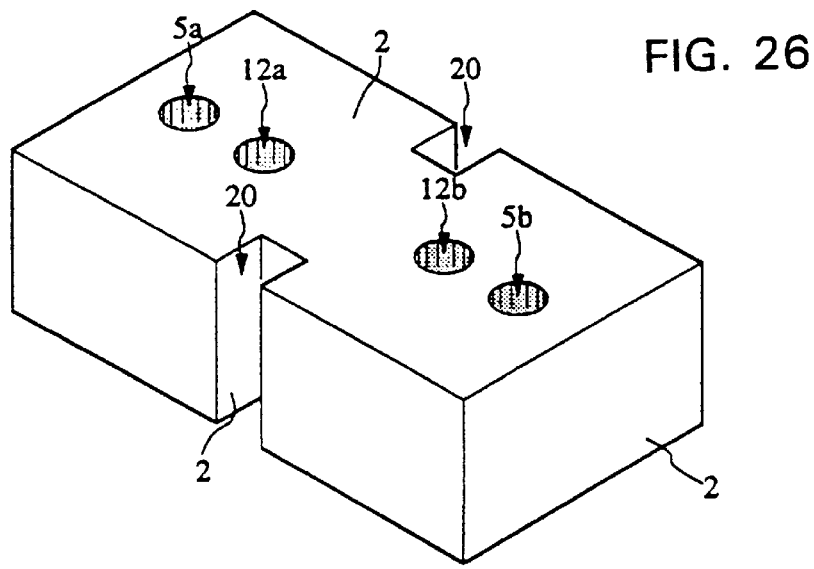
FIG. 26 is a perspective view of a dielectric waveguide filter according to a 23rd embodiment of the invention.
Figure 27:
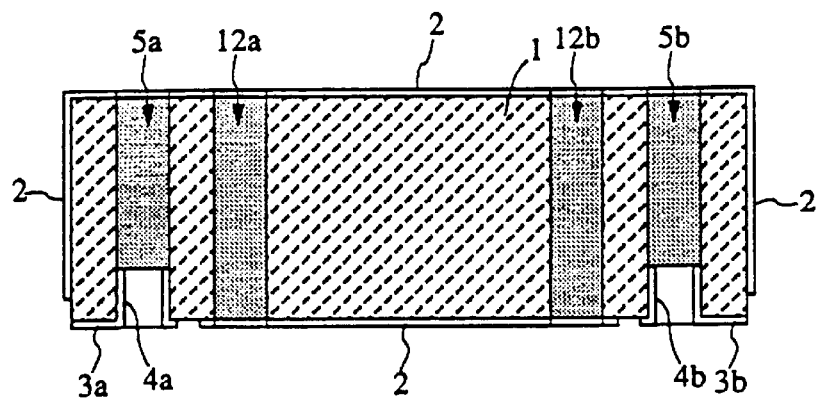
FIG. 27 is a cross-sectional view of the dielectric waveguide filter according to the 23rd embodiment of the invention.

FIG. 26 is a perspective view of a dielectric waveguide filter according to a 23rd embodiment of the invention wherein its cross section is shown in FIG. 27. This dielectric waveguide filter has an input/output structure different from that shown in FIGS. 24 and 25. In this embodiment, through-holes 5a and 5b are formed in a dielectric block 1 in such a manner that they extend along the shortest axis, and coupling electrodes 4a and 4b are formed on the inner surfaces of the respective through-holes 5a and 5b wherein one end of each coupling electrode 4a and 4b is electrically open-circuited inside the through-hole 5a or 5b. In this structure, the through-holes 5a and 5b, on the inner surfaces of which the coupling electrodes are formed, extend in the same direction as the direction of the through-holes 12a and 12b for adjusting the resonance frequency. This allows simplification in the structure of a mold used to form the dielectric block.

Figure 28:
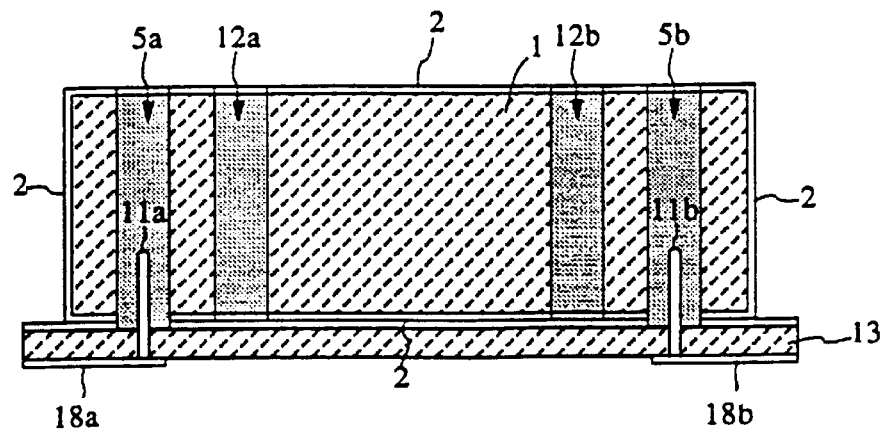
FIG. 28 is a cross-sectional view of a dielectric waveguide filter according to a 24th embodiment of the invention.

FIG. 28 is a cross-sectional view of a dielectric waveguide filter according to a 24th embodiment of the invention. As shown in the figure, the dielectric waveguide filter includes a substrate 13 of an insulating material. Thus, this filter consists of two major sections: a dielectric block section and an insulating substrate section. The dielectric block section is similar to that shown in FIGS. 26 and 27 except that no coupling electrodes 4a and 4b are provided. Pin-shaped conductors 11a and 11b project from the insulating substrate 13. The dielectric block section and the insulating substrate are combined together in such a manner that the pin-shaped conductors 11a and 11b are inserted into through-holes 5a and 5b formed in the dielectric block. Input/output electrodes 18a and 18b are formed on the insulating substrate 13 in such a manner that they are electrically connected to the respective pin-shaped conductors 11a and 11b thereby making connections to an external circuit.

Figure 29:
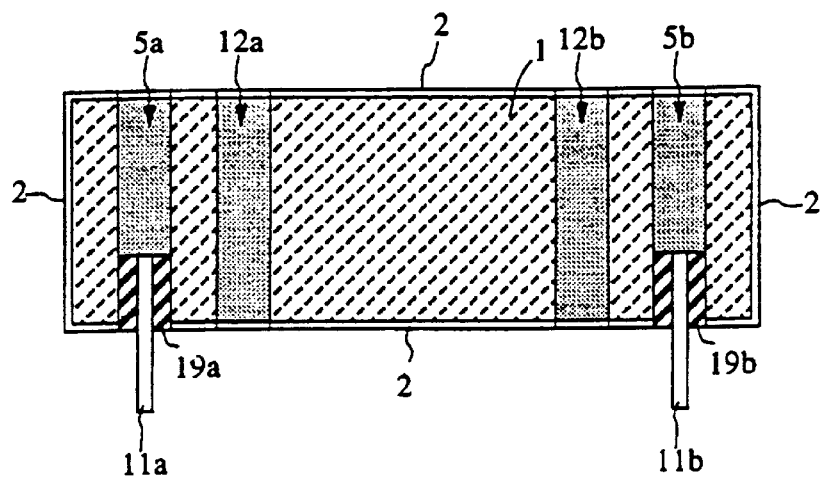
FIG. 29 is a cross-sectional view of a dielectric waveguide filter according to a 25th embodiment of the invention.

FIG. 29 is a cross-sectional view of a dielectric waveguide filter according to a 25th embodiment of the invention. In this embodiment, the filter includes a dielectric block 1 having similar structure to that shown in FIGS. 26 and 27 except that no coupling electrodes 4a and 4b are provided. The filter also includes pin-shaped conductors 11a and 11b which are inserted together with insulators 19a and 19b such as synthetic resin into through-holes 5a and 5b. These pin-shaped conductors 11a and 11b are electrically isolated by the insulators 19a and 19b. The dielectric waveguide filter is electrically connected to an external circuit via these pin-shaped conductors 11a and 11b.

Figure 30:
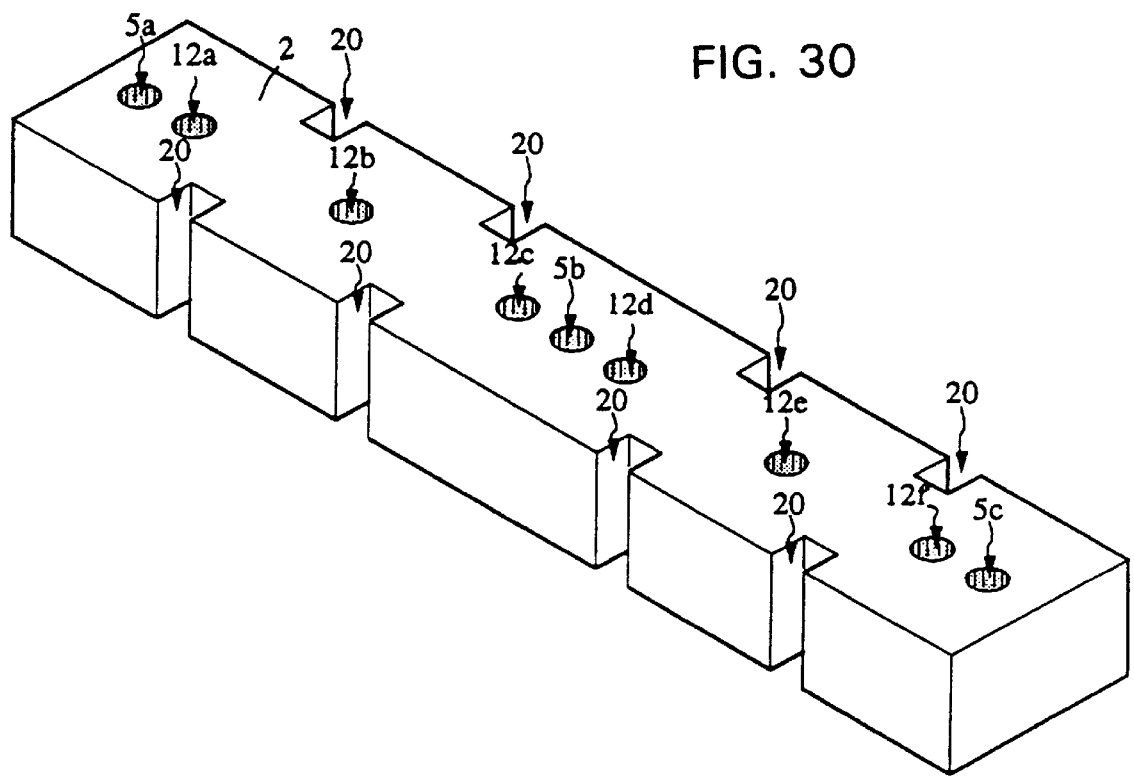
FIG. 30 is a perspective view of a dielectric waveguide filter according to a 26th embodiment of the invention.

FIG. 30 is a perspective view of a dielectric waveguide filter according to a 26th embodiment of the invention. In this embodiment, the dielectric waveguide filter serves as an antenna duplexer including a transmission filter and a reception filter formed in an integral fashion wherein the transmission and reception filters each consist of three stages of resonators. As shown in FIG. 30, the dielectric waveguide filter includes a dielectric block in the form of a generally rectangular prism whose outer surface is covered with a conducting film 2. Slots 20 are formed on longer sides of the dielectric block so that the dielectric blocks are divided by these slots into a plurality of sections along the longitudinal direction. The inner surfaces of these slots 20 are covered with the conducting film 2. Each section separated by the slots 20 acts as a resonator. A through-hole 12a, 12b, 12c, 12d, 12e, or 12f is formed in each resonator section in such a manner that each through-hole extends through the dielectric block in a direction along the shortest axis. No conducting film is formed on the inner surface of the through-holes 12a–12f. Coupling electrode through-holes 5a, 5c, and 5b are formed in two resonator sections located at either end and in the central resonator, respectively. As in the structure shown in FIG. 27, a coupling electrode is formed on the inner surface of each through-hole. The coupling electrode formed on the inner surface of the through-hole 5a is connected to a transmitting circuit, the coupling electrode formed on the inner surface of the through-hole 5c is connected to a receiving circuit, and the coupling electrode formed on the inner surface of the through-hole 5b is connected to an antenna. In this structure, the resonance frequencies of three stages of resonators forming the transmission filter are determined by the through-holes 12a, 12b, and 12c, and the resonance frequencies of three stages of resonators forming the reception filter are determined by the through-holes 12d, 12e, and 12f. The desired characteristics of the transmission and reception filters can be obtained by properly determining the size and location of each through-hole 12a–12f at the stage of design, or by partially removing the inner surfaces of the through-holes 12a–12f at the stage of adjustment.

The present invention has various advantages as described below.

According to an aspect of the invention, it is possible to adjust the resonance frequency by properly selecting the size and/or location of the through-hole or recess while keeping the outside dimensions of the dielectric block constant. Thus, it is possible to set the resonance frequency and unloaded Q to desired values over wide ranges by properly designing the outside dimensions of the dielectric block and the size or location of the through-hole or recess. This makes it possible to design the unloaded Q in a more flexible fashion.

According to another aspect of the invention, it is possible to produce a relatively great change in the resonance frequency by forming a small through-hole or recess. This technique also makes it possible to design the unloaded Q within an expanded range.

According to still another aspect of the invention, it is possible to selectively adjust only the resonance frequency in the second resonance mode relative to the resonance frequency in the first resonance mode even in the case where the resonance frequencies in the first and second resonance modes are close to each other. Thus, this technique makes it easy to adjust the difference in resonance frequency between two resonance modes.

According to a further aspect of the invention, the resonance frequencies in the first and second resonance modes are equally affected by the through-hole or recess and thus it is possible to simultaneously set the resonance frequencies in the two resonance modes to desired values simply by adjusting the single through-hole or recess.

According to another aspect of the invention, it is possible to easily set the resonance frequencies in two resonance modes such that they are equal to each other or they are close to each other.

According to still another aspect of the invention, the through-hole or recess is formed so that the formation of the through-hole or recess results in an enhanced perturbation effects on the electric field.

According to a further aspect of the invention, the through-hole or recess is formed in such a fashion that coarse and fine adjustments of the resonance frequency can be easily performed.

According to another aspect of the invention, a dielectric material having a dielectric constant different from that of the dielectric block is disposed in the through-hole or recess. This allows a reduction in size and also allows an improvement in the frequency-temperature characteristic.

According to still another aspect of the invention, the opening end of the through-hole or recess is covered with a conductor thereby ensuring that leakage of electromagnetic waves toward the outside or unwanted electromagnetic coupling with an external circuit can be prevented.

According to still another aspect of the invention, the connection to an external circuit can be achieved without having to insert an additional special member such as a probe into the hole from the outside. Furthermore, this structure provides excellent coupling to the external circuit without producing leakage of electromagnetic waves toward the outside.

According to another aspect of the invention, it is possible to form a coupling electrode in a flexible fashion in the dielectric block.

According to still another aspect of the invention, coupling to an external circuit can be achieved simply by inserting a pin-shaped conductor serving as a coupling member into the dielectric block. This technique allows a simplification of the overall structure of the dielectric waveguide filter.

According to still another aspect of the invention, it is possible to easily adjust the amount of coupling to an external circuit simply by partially removing the coupling electrode without having to use an additional special adjustment member and without producing leakage of electromagnetic waves toward the outside.

According to a further aspect of the invention, it is possible to adjust the amount of coupling to the external circuit simply by partially removing the coupling electrode formed on the inner surface of a hole formed in the dielectric block. This technique allows a great degree of simplification of the adjustment process.

According to a further aspect of the invention, the resonance frequency can be adjusted simply by partially removing the inner surface of the through-hole or recess. Thus, this technique allows a great degree of simplification of the adjustment process.

Although the invention has been illustrated in connection with embodiments thereof, the invention is not limited to those embodiments, but extends to all modifications and variations within the fair spirit and scope of the invention.

What is claimed is:

1. A dielectric waveguide filter comprising a dielectric block whose outer surface is covered with a conducting film,
    said dielectric waveguide filter having a pair of terminal electrodes isolated from said conducting film on a first face of the outer surface of said dielectric block;
    a pair of holes in said dielectric block extending from said first face to an opposite second face; and
    a respective coupling electrode on the inner surface of each said hole, wherein one end of said coupling electrode is connected to a respective said terminal electrode on said first face, and the other end of said coupling electrode is connected to said conducting film on said second face;
    wherein a portion of the inner surface of one of said holes near said second face has no coupling electrode thereon.

2. A dielectric waveguide filter comprising a dielectric block according to claim 1, wherein said dielectric filter has TE mode resonance.

3. A dielectric waveguide filter comprising a dielectric block according to claim 2, wherein said dielectric filter has TE101 mode resonance.

4. A dielectric waveguide filter comprising a dielectric block whose outer surface is covered with a conducting film,
    said dielectric waveguide filter having a pair of terminal electrodes isolated from said conducting film on a first face of the outer surface of said dielectric block;
    a pair of holes in said dielectric block extending from said first face to an opposite second face; and
    a respective coupling electrode on the inner surface of each said hole, wherein one end of said coupling electrode is connected to a respective said terminal electrode on said first face, and the other end of said coupling electrode is electrically open-circuited from said conducting film;
    wherein said dielectric filter has TE mode resonance.

5. A dielectric waveguide filter comprising a dielectric block according to claim 4, wherein said dielectric filter has TE101 mode resonance.

6. A method of adjusting the characteristics of a dielectric waveguide filter, said filter comprising a dielectric block whose outer surface is covered with a conducting film,
    said dielectric waveguide filter having a pair of terminal electrodes isolated from said conducting film on a first face of the outer surface of said dielectric block;
    a pair of holes in said dielectric block extending from said first face to an opposite second face; and
    a respective coupling electrode on the inner surface of each said hole, wherein one end of said coupling electrode is connected to a respective said terminal electrode on said first face, and the other end of said coupling electrode is connected to said conducting film on said second face,
    said method comprising the step of at least partially removing the coupling electrode, which is formed on the inner surface of at least one of said holes, thereby adjusting the amount of coupling to an external circuit;
    wherein said coupling electrode of said at least one of said holes is partially removed near said second face.

7. A method according to claim 6, wherein said coupling electrode of said at least one of said holes is completely removed near said second face, thereby electrically open-circuiting said coupling electrode from said conducting film.

* * * * *